(12) United States Patent
Togawa et al.

(10) Patent No.: US 11,721,357 B2
(45) Date of Patent: Aug. 8, 2023

(54) VOICE PROCESSING METHOD AND VOICE PROCESSING APPARATUS

(71) Applicant: FUJITSU LIMITED, Kawasaki (JP)

(72) Inventors: Taro Togawa, Kawasaki (JP); Sayuri Nakayama, Kawasaki (JP); Jun Takahashi, Kawasaki (JP); Kiyonori Morioka, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 198 days.

(21) Appl. No.: 16/742,493

(22) Filed: Jan. 14, 2020

(65) Prior Publication Data

US 2020/0251129 A1  Aug. 6, 2020

(30) Foreign Application Priority Data

Feb. 4, 2019  (JP) ................................ 2019-017950

(51) Int. Cl.
*G10L 25/63* (2013.01)
*G10L 25/18* (2013.01)
(Continued)

(52) U.S. Cl.
CPC ............. *G10L 25/63* (2013.01); *G10L 17/00* (2013.01); *G10L 17/02* (2013.01); *G10L 25/18* (2013.01);
(Continued)

(58) Field of Classification Search
None
See application file for complete search history.

(56) References Cited

U.S. PATENT DOCUMENTS 10,896,428 B1 * 1/2021 Balasubramaniam .. G10L 15/02
2012/0089396 A1 * 4/2012 Patel ....................... G10L 25/00
704/249
(Continued)

FOREIGN PATENT DOCUMENTS

| JP | 2012-137680 | 7/2012 | |
| JP | 2017-111760 | 6/2017 | |
| WO | WO-2007017853 A1 * | 2/2007 | ............. G10L 17/26 |

OTHER PUBLICATIONS

Bohan Chen et al., "Increasing Accuracy of Bottom-up Speaker Diarization by Cluster Selection", published in Information Processing Society of Japan Research Report Spoken Language Processing (SLP), vol. 2012-SLP-94, No. 27, pp. 1-6, Dec. 21, 2012.
(Continued)

*Primary Examiner* — Pierre Louis Desir
*Assistant Examiner* — Nicole A K Schmieder
(74) *Attorney, Agent, or Firm* — Staas & Halsey LLP

(57) ABSTRACT

A non-transitory computer-readable recording medium having stored therein a program that causes a computer to execute a procedure, the procedure includes detecting a plurality of voice sections from an input sound that includes voices of a plurality of speakers, calculating a feature amount of each of the plurality of voice sections, determining a plurality of emotions, corresponding to the plurality of voice sections respectively, of a speaker of the plurality of speakers for each of the plurality of voice sections, and clustering a plurality of feature amounts, based on a change vector from the feature amount of the voice section determined as a first emotion of the plurality of emotions of the speaker to the feature amount of the voice section determined as a second emotion of the plurality of emotions different from the first emotion.

12 Claims, 18 Drawing Sheets

(51) Int. Cl.
*G10L 25/90* (2013.01)
*G10L 25/84* (2013.01)
*G10L 17/02* (2013.01)
*G10L 25/21* (2013.01)
*G10L 17/00* (2013.01)

(52) U.S. Cl.
CPC .............. *G10L 25/21* (2013.01); *G10L 25/84* (2013.01); *G10L 25/90* (2013.01)

(56) References Cited

U.S. PATENT DOCUMENTS

| | | | |
|---|---|---|---|
| 2012/0116186 A1* | 5/2012 | Shrivastav | A61B 5/4803 600/301 |
| 2012/0166195 A1 | 6/2012 | Hayakawa et al. | |
| 2015/0206543 A1* | 7/2015 | Lee | G10L 25/63 704/270 |
| 2021/0043208 A1* | 2/2021 | Luan | G10L 15/22 |

OTHER PUBLICATIONS

D. Talkin, "A Robust Algorithm for Pitch Tracking (RAPT)", in Speech Coding and Synthesis, W.B. Kleijn and K.K. Pailwal (Eds.), Elsevier, pp. 495-518, 1995.

\* cited by examiner

FIG. 1
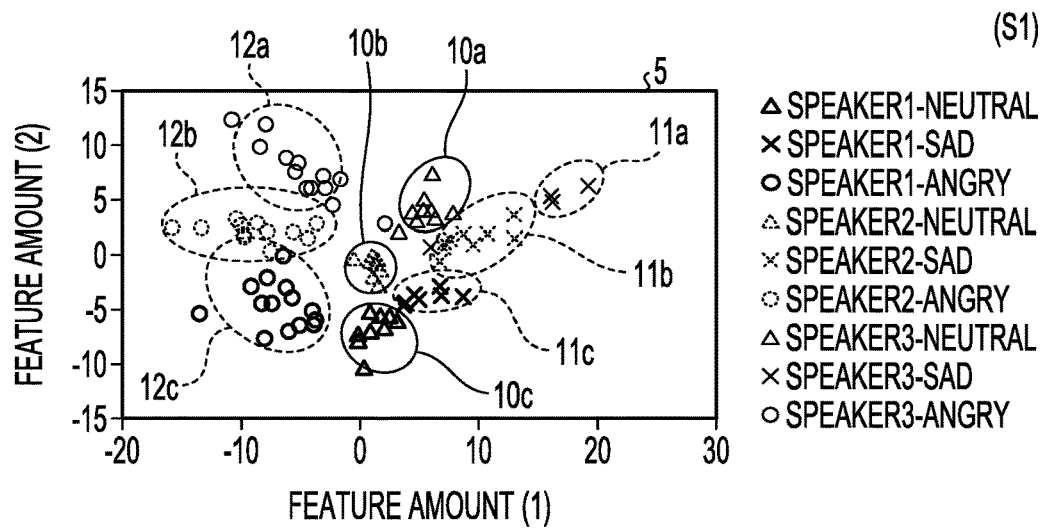
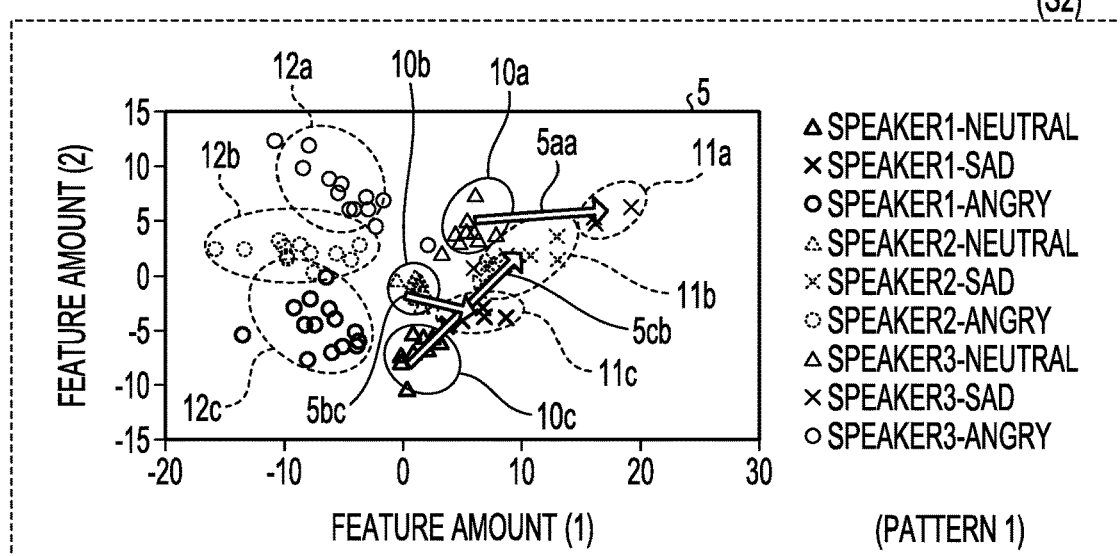
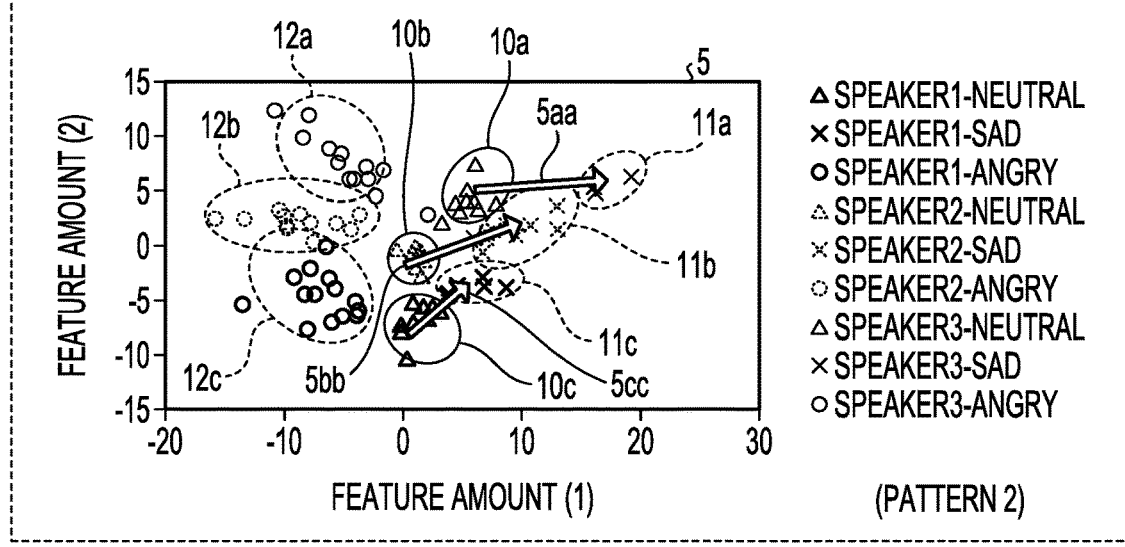

FIG. 2
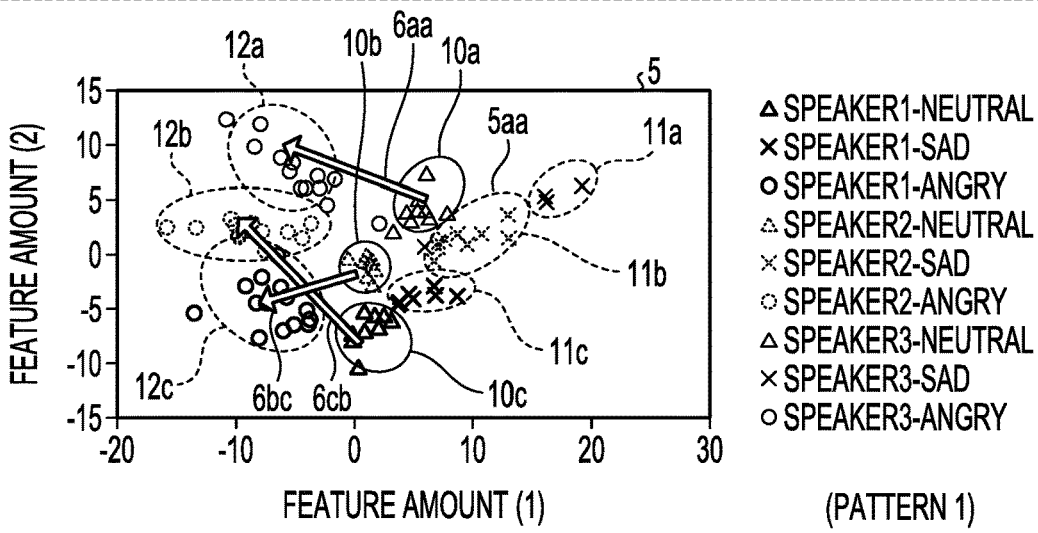
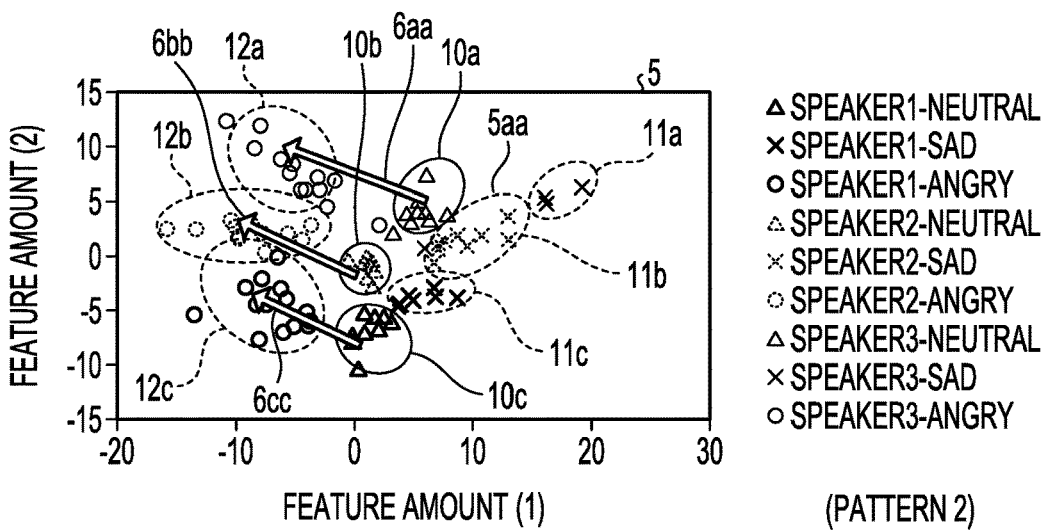
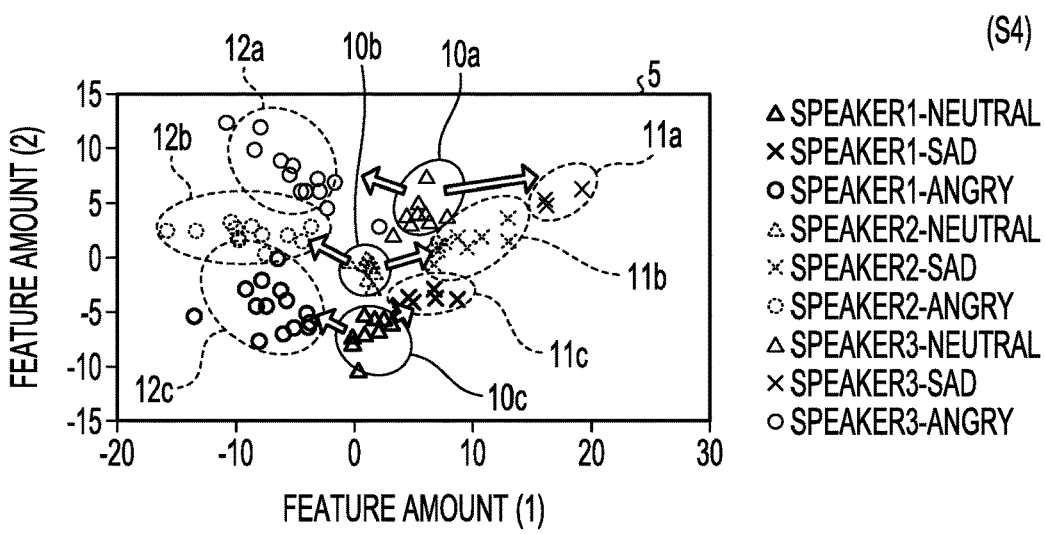

FIG. 11
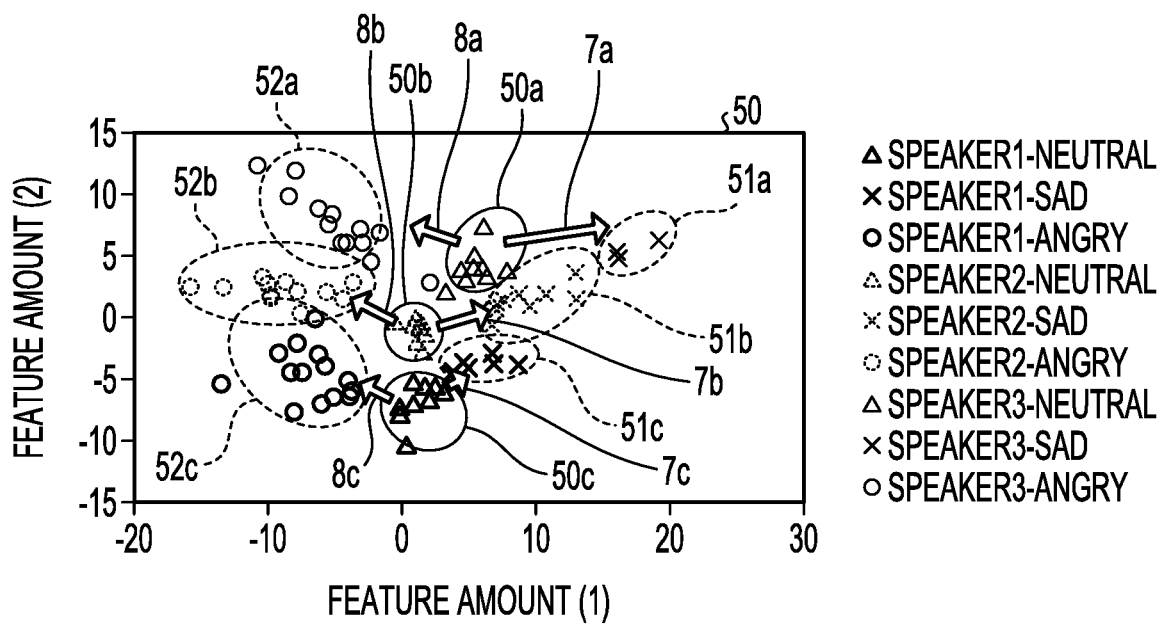
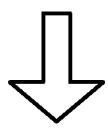
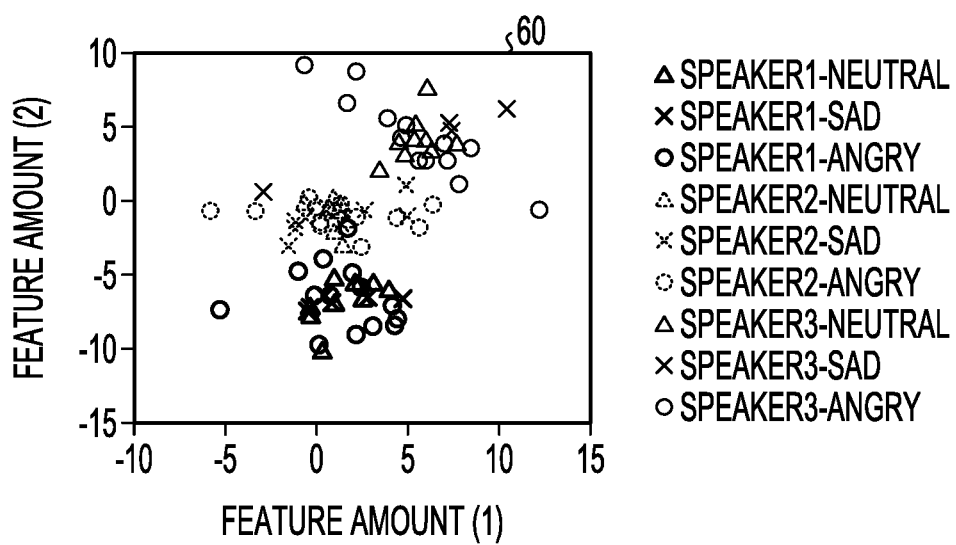

VOICE PROCESSING METHOD AND VOICE PROCESSING APPARATUS

CROSS-REFERENCE TO RELATED APPLICATION

This application is based upon and claims the benefit of the prior Japanese Patent Application No. 2019-017950, filed on Feb. 4, 2019, the entire contents of which are incorporated herein by reference.

FIELD

The embodiments discussed herein are related to a voice processing method and a voice processing apparatus.

BACKGROUND

There is a recent technique that converts voice data into text data. For example, a minutes may be readily created in a company by recording a voice at a meeting and converting the recorded voice data into text data.

Here, in a meeting where a plurality of speakers participates, since a plurality of speakers' utterances are mixed in the voice data, there is a demand for a technique that identifies the voice of a specific speaker included in the voice data. In this regard, there is related art for identifying a speaker for each utterance by repeatedly clustering a process of joining utterances having high acoustic similarity in the same cluster.

Related techniques are disclosed in, for example, Japanese Laid-Open Patent Publication Nos. 2017-111760 and 2012-137680.

Related techniques are also disclosed in, for example, an article entitled "High precision of bottom-up speaker dialization by cluster selection," by Bohan Chen, Norihide Kitaoka, Kazuya Takeda, published in Information Processing Society of Japan Research Report Spoken Language Processing (SLP), 2012-SLP-94 (27) 1-6.

SUMMARY

According to an aspect of the embodiments, a non-transitory computer-readable recording medium having stored therein a program that causes a computer to execute a procedure, the procedure includes detecting a plurality of voice sections from an input sound that includes voices of a plurality of speakers, calculating a feature amount of each of the plurality of voice sections, determining a plurality of emotions, corresponding to the plurality of voice sections respectively, of a speaker of the plurality of speakers, and clustering a plurality of feature amounts, based on a change vector from the feature amount of the voice section determined as a first emotion of the plurality of emotions of the speaker to the feature amount of the voice section determined as a second emotion of the plurality of emotions different from the first emotion.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1 is a view (1) for explaining an example of processing of a voice processing apparatus according to a first embodiment;

FIG. 2 is a view (2) for explaining an example of processing of a voice processing apparatus according to a first embodiment;

FIG. 11 is a view (1) for explaining processing of a clustering unit according to the second embodiment;

DESCRIPTION OF EMBODIMENTS

When a speaker's emotion changes, there is a problem that one speaker included in a plurality of speakers may not be associated with a voice included in voice data.

Figure 18:
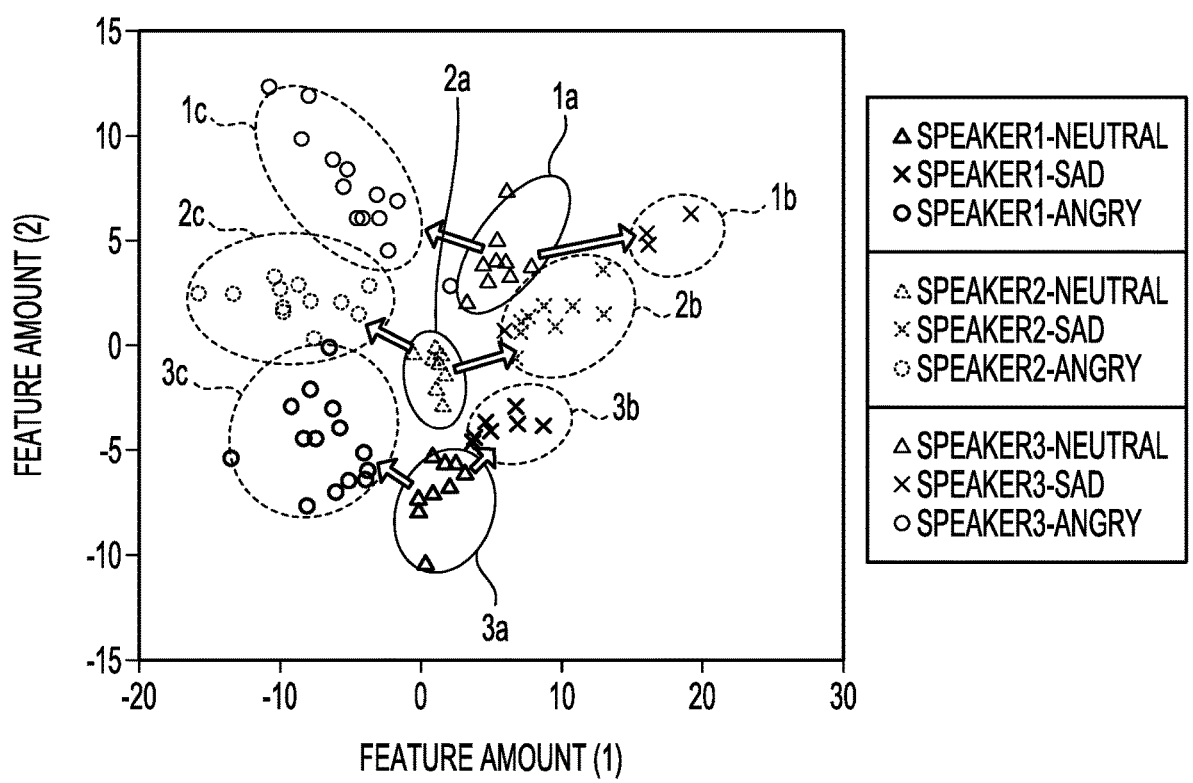
FIG. 18 is a view for explaining a problem in the related art.

FIG. 18 is a view for explaining a problem in the related art. In FIG. 18, for the purpose of simple explanation of a feature amount space, the 1024-dimensional feature amount is compressed into a two-dimensional (feature amount (1), feature amount (2)) feature amount space by principal component analysis, and the voice feature amount (a point on the feature amount space determined by the feature amount) of each speaker is displayed on the feature amount space. In the graph of FIG. 18, the horizontal axis corresponds to the feature amount (1), and the vertical axis corresponds to the feature amount (2).

As illustrated in FIG. 18, the voice feature amount varies with the emotional change of the speaker. For example, when the emotion of a speaker 1 is "neutral," each feature amount of voice is included in a region 1a. When the emotion of the speaker 1 changes from "neutral" to "sad," each feature amount of voice shifts from the region 1a to a region 1b. Meanwhile, when the emotion of the speaker 1 changes from "neutral" to "angry," each feature amount of voice shifts from the region 1a to a region 1c.

For example, when the emotion of a speaker 2 is "neutral," each feature amount of voice is included in a region 2a. When the emotion of the speaker 2 changes from "neutral" to "sad," each feature amount of voice shifts from the region 2a to a region 2b. Meanwhile, when the emotion of the speaker 2 changes from "neutral" to "angry," each feature amount of voice shifts from the region 2a to a region 2c.

For example, when the emotion of a speaker 3 is "neutral," each feature amount of voice is included in a region 3a. When the emotion of the speaker 3 changes from "neutral" to "sad," each feature amount of voice shifts from the region 3a to a region 3b. Meanwhile, when the emotion of the speaker 3 changes from "neutral" to "angry," each feature amount of voice shifts from the region 3a to a region 3c.

As illustrated in FIG. 18, since the feature amounts of voices of the speakers 1 to 3 are dispersed according to the emotional change of the speakers, the clustering performance becomes lower and, as a result, the speakers may not be accurately associated with the voices. For example, when the feature amount of voice of the speaker 1 in the region 1a and the feature amount of voice of the speaker 2 in the region 2b are classified into the same cluster, the voice of the speaker 1 and the voice of the speaker 2 are determined as the voice of the same speaker.

Hereinafter, detailed descriptions will be made on embodiments of a technique capable of associating one of a plurality of speakers with a voice included in voice data when the emotion of the speaker changes with reference to the accompanying drawings. In addition, the present disclosure is not limited to the embodiments described herein.

First Embodiment

FIGS. 1 and 2 are views for explaining an example of processing of a voice processing apparatus according to a first embodiment. In FIGS. 1 and 2, for the purpose of simple explanation of a feature amount space, the 1024-dimensional feature amount is compressed into a two-dimensional (feature amount (1), feature amount (2)) feature amount space by principal component analysis, and the voice feature amount (a point on the feature amount space determined by the feature amount) of each speaker is displayed on the feature amount space. In the graphs of FIGS. 1 and 2, the horizontal axis corresponds to the feature amount (1), and the vertical axis corresponds to the feature amount (2). For example, the voice processing apparatus executes the following operations S1 to S3.

The operation S1 in FIG. 1 will be described. The voice processing apparatus detects a plurality of voice sections from an input sound, extracts a feature amount for each of the voice sections, and determines the emotion of a speaker for each of the voice sections. The voice processing apparatus classifies a plurality of feature amounts into clusters 10a, 10b and 10c by performing clustering on feature amounts of each voice section determined that the speaker's emotion is "neutral." For example, the voice processing apparatus associates the cluster 10a with "speaker 1," associates the cluster 10b with "speaker 2," and associates the cluster 10c with "speaker 3."

The voice processing apparatus classifies a plurality of feature amounts into clusters 11a, 11b and 11c by performing clustering on feature amounts of each voice section determined that the speaker's emotion is "sad." The voice processing apparatus classifies a plurality of feature amounts into clusters 12a, 12b and 12c by performing clustering on feature amounts of each voice section determined that the speaker's emotion is "angry."

The operation S2 in FIG. 1 will be described. The voice processing apparatus according to the present embodiment associates the clusters 10a to 10c with the clusters 11a to 11c with attention paid to the fact that "the directions of change in the feature value accompanying an emotion do not follow speakers but are almost similar regardless of the speakers." Further, the voice processing apparatus associates the clusters 10a to 10c with the clusters 12a to 12c.

The voice processing apparatus selects one unselected start point cluster from the clusters 10a to 10c, selects one unselected end point cluster from the clusters 11a to 11c, and specifies a "change vector" connecting the selected start point cluster and the selected end point cluster. The voice processing apparatus specifies a plurality of change vectors by repeatedly executing the above process. For example, the number of patterns of each change vector specified based on the clusters 10a to 10c and the clusters 11a to 11c are six patterns. For convenience of explanation, each change vector corresponding to two patterns is shown here.

For example, in pattern 1, change vectors 5aa, 5bc, and 5cb are specified. The change vector 5aa connects the start point cluster 10a and the end point cluster 11a. The change vector 5bc connects the start point cluster 10b and the end point cluster 11c. The change vector 5cb connects the start point cluster 10c and the end point cluster 11b.

In pattern 2, change vectors 5aa, 5bb, and 5cc are specified. The change vector 5aa connects the start point cluster 10a and the end point cluster 11a. The change vector 5bb connects the start point cluster 10b and the end point cluster 11b. The change vector 5cc connects the start point cluster 10c and the end point cluster 11c.

Although not shown, the voice processing apparatus specifies each change vector for the remaining patterns. The voice processing apparatus evaluates the similarity in the directions of change vectors for each pattern to specify a pattern with the highest similarity. Then, the similarity in the directions of the change vectors 5aa, 5bb and 5cc indicated in pattern 2 is the largest compared to the other patterns. Thus, the voice processing apparatus associates the cluster 11a connected to the cluster 10a in the change vector 5aa with speaker 1. The voice processing apparatus associates the cluster 11b connected to the cluster 10b in the change vector 5bb with speaker 2. The voice processing apparatus associates the cluster 11c connected to the cluster 10c in the change vector 5cc with speaker 3.

The operation S3 in FIG. 2 will be described. The voice processing apparatus selects one unselected start point cluster from the clusters 10a to 10c, selects one unselected end point cluster from the clusters 12a to 12c, and specifies a change vector connecting the selected start point cluster and the selected end point cluster. The voice processing apparatus specifies a plurality of change vectors by repeatedly executing the above process. For example, the number of patterns of each change vector specified based on the clusters 10a to 10c and the clusters 12a to 12c are six patterns. Hereinafter, for convenience of explanation, each change vector corresponding to two patterns is shown.

For example, in pattern 1, change vectors 6aa, 6bc, and 6cb are specified. The change vector 6aa connects the start point cluster 10a and the end point cluster 12a. The change vector 6bc connects the start point cluster 10b and the end point cluster 12c. The change vector 6cb connects the start point cluster 10c and the end point cluster 12b.

In pattern 2, change vectors 6aa, 6bb, and 6cc are specified. The change vector 6aa connects the start point cluster 10a and the end point cluster 12a. The change vector 6bb connects the start point cluster 10b and the end point cluster 12b. The change vector 6cc connects the start point cluster 10c and the end point cluster 12c.

Although not shown, the voice processing apparatus specifies each change vector for the remaining patterns. The voice processing apparatus evaluates the similarity in the directions of change vectors for each pattern to specify a pattern with the highest similarity. Then, the similarity in the directions of the change vectors 6aa, 6bb and 6cc indicated in pattern 2 is the largest compared to the other patterns. Thus, the voice processing apparatus associates the cluster 12a connected to the cluster 10a in the change vector 6aa with speaker 1. The voice processing apparatus associates the cluster 12b connected to the cluster 10b in the change vector 6bb with speaker 2. The voice processing apparatus associates the cluster 12c connected to the cluster 10c in the change vector 6cc with speaker 3.

The operation S4 in FIG. 2 will be described. As described above, the voice processing apparatus associates the clusters based on the similarity of the directions of the change vectors with attention paid to the fact that "the directions of change in feature value accompanying an emotion do not follow speakers but are almost similar regardless of speakers." Specifically, the voice processing apparatus associates the cluster 10a with the clusters 11a and 12a, and determines the voice of the feature amounts classified into the clusters 10a, 11a, and 12a as the voice of speaker 1. The voice processing apparatus associates the cluster 10b with the clusters 11b and 12b, and determines the voice of the feature amounts classified into the clusters 10b, 11b, and 12b as the voice of speaker 2. The voice processing apparatus associates the cluster 10c with the clusters 11c and 12c, and determines the voice of the feature amounts classified into the clusters 10c, 11c, and 12c as the voice of speaker 3. As a result, even when the speaker's emotion changes, the voice processing apparatus is able to associate one speaker included in the plurality of speakers with the voice included in the speech data.

Figure 3:
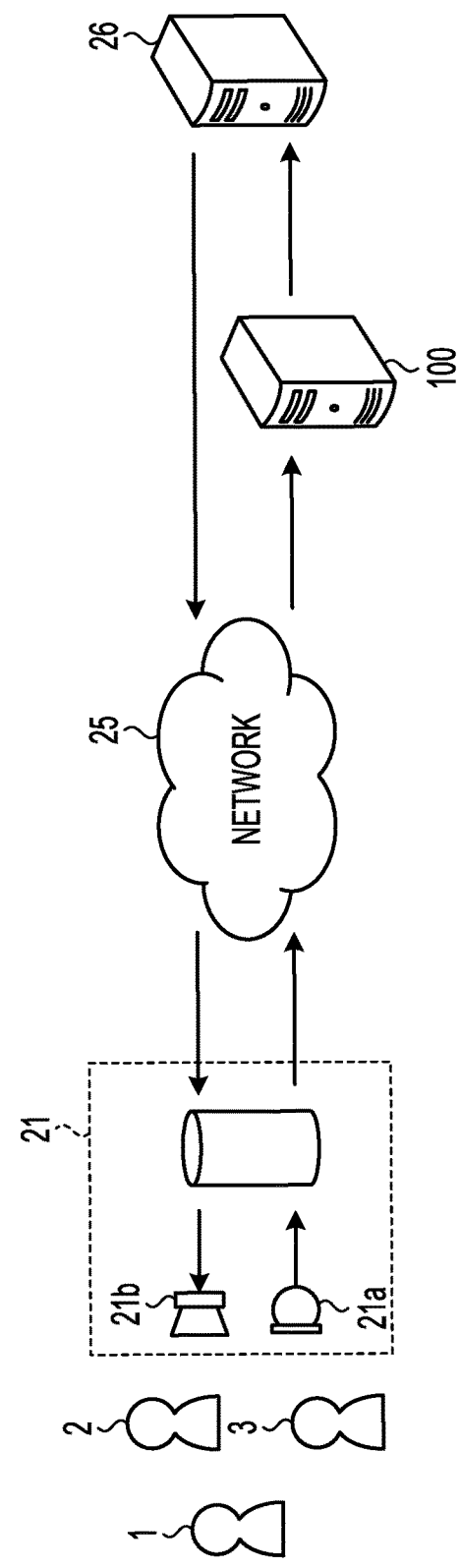
FIG. 3 is a view illustrating an example of a system according to the first embodiment.

Next, an example of a system according to the first embodiment will be described. FIG. 3 is a view illustrating an example of a system according to the first embodiment. As illustrated in FIG. 3, the system includes a smart speaker 21, a server 26, and a voice processing apparatus 100. The smart speaker 21, the server 26, and the voice processing apparatus 100 are connected to a network 25.

The smart speaker 21 includes a microphone 21a and a speaker 21b. The smart speaker 21 converts the voice of each speaker collected using the microphone 21a into input voice information, and transmits the input voice information to the voice processing apparatus 100. Further, when response voice information corresponding to the input voice information is received from the server 26, the smart speaker 21 outputs the received response voice information to the speaker 21b.

When the input voice information is received from the smart speaker 21, the voice processing apparatus 100 extracts a feature amount for each voice section of the input voice information, and determines the emotion of a speaker. The voice processing apparatus 100 clusters a plurality of feature amounts based on change vectors of feature amounts accompanying emotional changes, and associates a voice with a speaker for each voice section based on the clustering result. The voice processing apparatus 100 transmits, to the server 26, user voice information in which the voice of each voice section is associated with speaker identification information.

When the user voice information is received, the server 26 analyzes the user voice information and generates response voice information for responding to the user voice information. The server 26 transmits the response voice information to the smart speaker 21.

Figure 4:
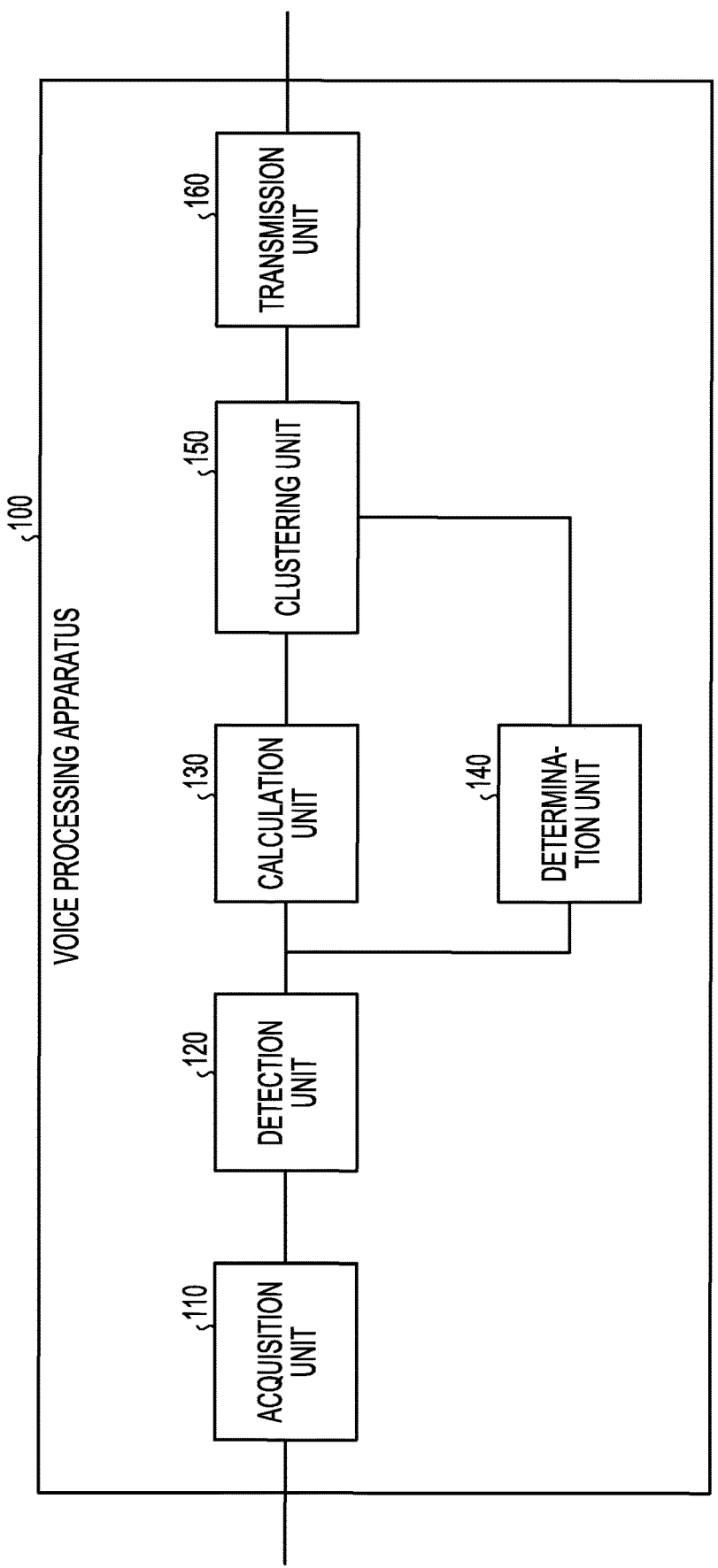
FIG. 4 is a functional block diagram illustrating the configuration of the voice processing apparatus according to the first embodiment.

Next, an example of the configuration of the voice processing apparatus 100 illustrated in FIG. 3 will be described. FIG. 4 is a functional block diagram illustrating the configuration of the voice processing apparatus according to the first embodiment. As illustrated in FIG. 4, the voice processing apparatus 100 includes an acquisition unit 110, a detection unit 120, a calculation unit 130, a determination unit 140, a clustering unit 150, and a transmission unit 160. Each of the units 110 to 160 is implemented by, for example, a CPU (Central Processing Unit), an MPU (Micro Processing Unit) or the like to execute a program stored in the voice processing apparatus 100 using a RAM (Random Access Memory) or the like as a work area. Each of the units 110 to 160 may be implemented by an integrated circuit such as an ASIC (Application Specific Integrated Circuit), an FPGA (Field Programmable Gate Array) or the like.

The acquisition unit 110 is a processing unit that acquires input voice information from the smart speaker 21. The acquisition unit 110 outputs the acquired input voice information to the detection unit 120. The input voice information is an example of an input sound.

The detection unit 120 is a processing unit that detects a plurality of voice sections from the input voice information. For example, the detection unit 120 specifies the power of the input voice information, and detects a section, which is sandwiched between silent sections where the power is less than a threshold value, as a voice section. The detection unit 120 may detect a voice section by using the technique disclosed in WO 2009/145192.

For example, the detection unit 120 divides the input voice information, which is delimited by the voice sections, into fixed-length frames, and outputs each of the frames to the calculation unit 130 and the determination unit 140. The detection unit 120 allocates frame numbers in time series for the frames. In addition, the detection unit 120 may output input voice information including a silent section to the calculation unit 130 to calculate an SNR (Signal-Noise Ratio).

The calculation unit 130 is a processing unit that calculates a feature amount based on a voice signal included in a frame. For example, the calculation unit 130 calculates a spectrum autocorrelation, a formant frequency, a waveform autocorrelation, a pitch frequency, a frame power, an SNR and an average spectrum power as feature amounts. Such feature amounts may be said to be feature amounts related to the harmonicity, periodicity or strength of the voice signal.

An example of a process of the calculation unit 130 to calculate a "spectrum autocorrelation (autocorrelation coefficient)" as a feature amount will be described. For example, the calculation unit 130 calculates the maximum autocorrelation value AC2(n) (n represents a frame number) within a predetermined range of shift amount based on Equation (1). In Equation (1), P(f, n) represents a spectrum at the frequency "f" of the voice signal included in the frame of the frame number "n." The calculation unit 130 applies an FFT (Fast Fourier Transform) or the like to the voice signal C(t) to calculate the spectrum P(f, n).

$$AC2(n) = \max_{j=1\sim K}\left\{\sum_{f=Fmin}^{Fmax} P(f, n) \cdot P(f + j, n)\right\} \quad (1)$$

Figure 5:
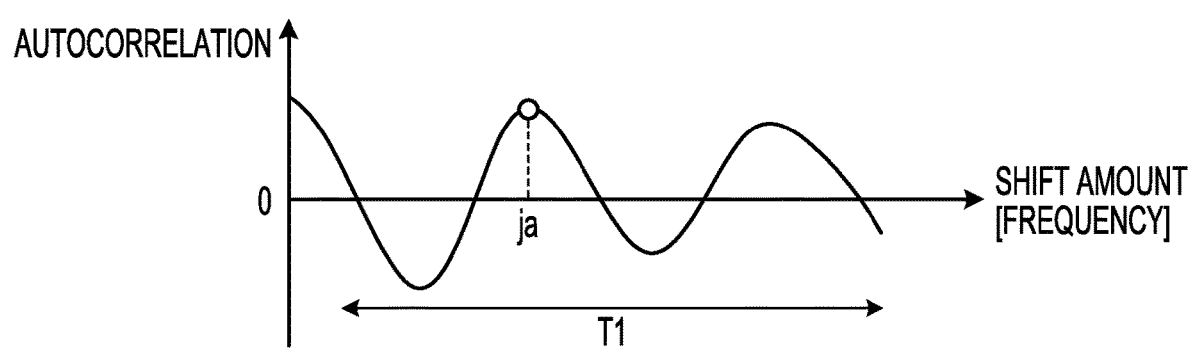
FIG. 5 is a view illustrating an example of autocorrelation of a spectrum.

FIG. 5 is a view illustrating an example of the spectrum autocorrelation. In FIG. 5, the horizontal axis corresponds to the frequency shift amount, and the vertical axis corresponds to the spectrum autocorrelation. In the example illustrated in FIG. 5, the maximum autocorrelation value is obtained when the frequency shift amount j=ja in a predetermined range T1 set in advance. That is, for the frame of the frame number "n," the spectrum autocorrelation value AC2(n) is an autocorrelation value when the frequency shift amount j=ja.

An example of a process of the calculation unit 130 to calculate the "formant frequency" as a feature amount will be described. The voice quality may be evaluated depending on whether or not the formant frequency is included in a predetermined range.

The calculation unit 130 calculates a plurality of formant frequencies by performing a linear prediction coding analysis on the voice signal C(t) included in the frame and extracting a plurality of peaks. For example, the calculation unit 130 calculates a first formant frequency F1, a second formant frequency F2 and a third formant frequency F3 in the ascending order of frequency. The calculation unit 130 may calculate the formant frequencies using the technique disclosed in Japanese Laid-Open Patent Publication No. 62-54297.

An example of a process of the calculation unit 130 to calculate the "waveform autocorrelation (autocorrelation coefficient)" as a feature amount will be described. For example, the calculation unit 130 calculates the maximum autocorrelation value AC(n) (n represents a frame number) in a predetermined range of shift amount based on Equation (2). In Equation (2), C(t) represents the magnitude of the voice signal at time "t." The symbol "M" is a time length of one frame. For example, the time length of one frame is 20 ms.

$$AC(n) = \max_{j=1 \sim K} \left\{ \sum_{t=n*M}^{(n+1)*M-1} C(t) \cdot C(t+j) \right\} \quad (2)$$

Figure 6:
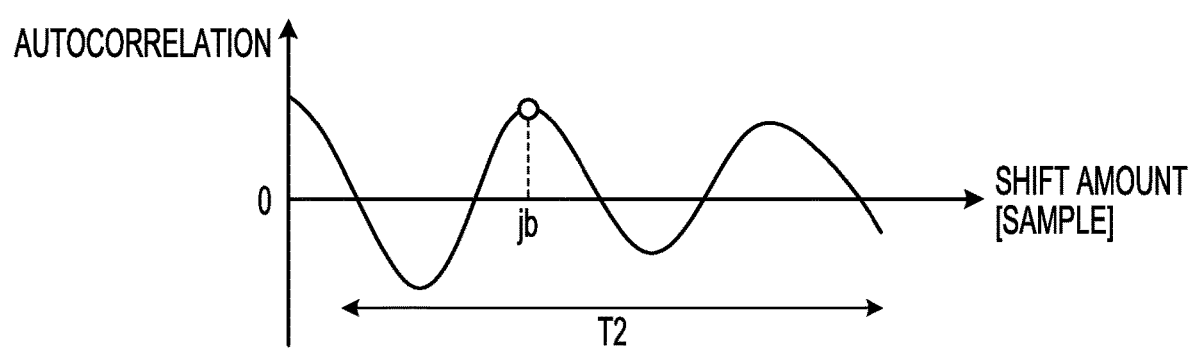
FIG. 6 is a view illustrating an example of autocorrelation of a waveform.

FIG. 6 is a view illustrating an example of the waveform autocorrelation. In FIG. 6, the horizontal axis corresponds to the time shift amount, and the vertical axis corresponds to the waveform autocorrelation. In the example illustrated in FIG. 6, the maximum autocorrelation value is obtained when the time shift amount j=jb in a predetermined range T2 set in advance. That is, for the frame of the frame number "n," the waveform autocorrelation value AC(n) is an autocorrelation value when the time shift amount j=jb.

An example of a process of the calculation unit 130 to calculate the "pitch frequency" as a feature amount will be described. The voice quality may be evaluated based on a determination as to whether or not the pitch frequency is included in a predetermined range (e.g., 100 Hz to 400 Hz).

The calculation unit 130 calculates the pitch frequency p(n) of the voice signal included in the frame using an estimation method of RAPT (Robust Algorithm for Pitch Tracking). The calculation unit 130 may calculate the pitch frequency using the technique described in "D. Talkin, 'A Robust Algorithm for Pitch Tracking (RAPT),'" in Speech Coding & Synthesis, W B Kleijn and K. K. Pailwal (Eds.), Elsevier, pp. 495-518, 1995."

An example of a process of the calculation unit 130 to calculate the "frame power" as a feature amount will be described. For example, the calculation unit 130 calculates the power S(n) in a frame having a predetermined length based on Equation (3). In Equation (3), "n" represents a frame number, "M" represents a time length of one frame (e.g., 20 ms), and "t" represents time. In addition, the calculation unit 130 may calculate a time-smoothed power as the frame power using a predetermined smoothing coefficient.

$$s(n) = 10\log_{10}\left( \sum_{t=n*M}^{(n+1)*M-1} C(t)^2 \right) \quad (3)$$

An example of a process of the calculation unit 130 to calculate the "SNR" as a feature amount will be described. The calculation unit 130 divides the input voice information into a plurality of frames, and calculates the power S(n) for each frame. The calculation unit 130 calculates the power S(n) based on Equation (3). The calculation unit 130 determines whether or not there is an utterance section based on the power S(n).

When the power S(n) is larger than a threshold value TH1, the calculation unit 130 determines that an utterance is included in the frame with the frame number n, and sets v(n) to 1. Meanwhile, when the power S(n) is equal to or smaller than the threshold value TH1, the calculation unit 130 determines that no utterance is included in the frame with the frame number n, and sets v(n) to 0.

The calculation unit 130 updates a noise level N according to the utterance section determination result v1(n). When "v(n)=1," the calculation unit 130 updates the noise level N(n) based on Equation (4). Meanwhile, when "v(n)=0," the calculation unit 130 updates the noise level N(n) based on Equation (5). In Equations (4) and (5)," coef represents an oblivion coefficient and has a value such as 0.9.

$$N(n)=N(n-1)*coef+S(n)*(1-coef) \quad (4)$$

$$N(n)=N(n-1) \quad (5)$$

The calculation unit 130 calculates SNR(n) based on Equation (6).

$$SNR(n)=S(n)-N(n) \quad (6)$$

An example of a process of the calculation unit 130 to calculate the "spectrum average power" as a feature amount will be described. The calculation unit 130 applies an FFT or the like to the voice signal C(t) included in the frame to calculate the spectrum P(f, n). The calculation unit 130 calculates the spectrum average power P_ave(n) based on Equation (7). In Equation (7), "f" represents a frequency. In addition, a frequency range corresponding to voice is set in the above band. For example, among boundary values of the frequency range, 100 Hz is set as the lower limit value Fmin, and 2,000 Hz is set as the upper limit value Fmax. In addition, the calculation unit 130 may convert the frequency axis into a mel scale.

$$P\_ave(n) = \frac{1}{(Fmax - Fmin)} \sum_{f=Fmin}^{Fmax} P(f, n) \quad (7)$$

The calculation unit 130 calculates the above-described feature amount for each frame, and outputs the calculated feature amount to the clustering unit 150. The calculation unit 130 outputs, to the clustering unit 150, "feature amount information" in which a frame number is associated with a feature amount calculated from a frame having this frame number. For example, the calculation unit 130 generates the feature amount information for each frame and outputs a plurality of feature amount information to the clustering unit 150.

The determination unit 140 is a processing unit that determines the emotion of a speaker based on the voice signal included in the frame. For example, the determination unit 140 detects, from the voice, voice intensity, a tempo indicating a voice appearance speed, and an intonation indicating an intensity change pattern in each word of the voice. The determination unit 140 obtains a change amount for each of the voice intensity, the voice tempo, and the voice intonation, and determines whether the emotion of the voice signal included in the frame is neutral, sad or angry based on the obtained change amount. For example, the determination unit 140 may determine the emotion using the technique described in Japanese Laid-Open Patent Publication No. 2002-091482.

The determination unit 140 outputs, to the clustering unit 150, "emotion information" in which a frame number is associated with the emotion determined from a frame of this frame number. For example, the determination unit 140 generates the emotion information for each frame and outputs a plurality of emotion information to the clustering unit 150.

The clustering unit 150 is a processing unit that clusters a plurality of feature amounts based on a change vector from the feature amount of the voice section determined as neutral emotion to the feature amount of the voice section determined as sad or angry emotion. Based on the clustering result, the clustering unit 150 associates the voice section in which the feature amount is calculated, with a speaker.

For example, the clustering unit 150 executes a pre-clustering process, a vector calculation process, a similarity evaluation process and a speaker association process.

An example of the "pre-clustering process" executed by the clustering unit 150 will be described. The clustering unit 150 detects a feature amount extracted from a frame in which the emotion is determined to be "neutral" based on the plurality of feature amount information and the plurality of emotion information. In the following description, the feature amount extracted from the frame in which the emotion is determined to be "neutral" is referred to as a "first feature amount."

Figure 7:
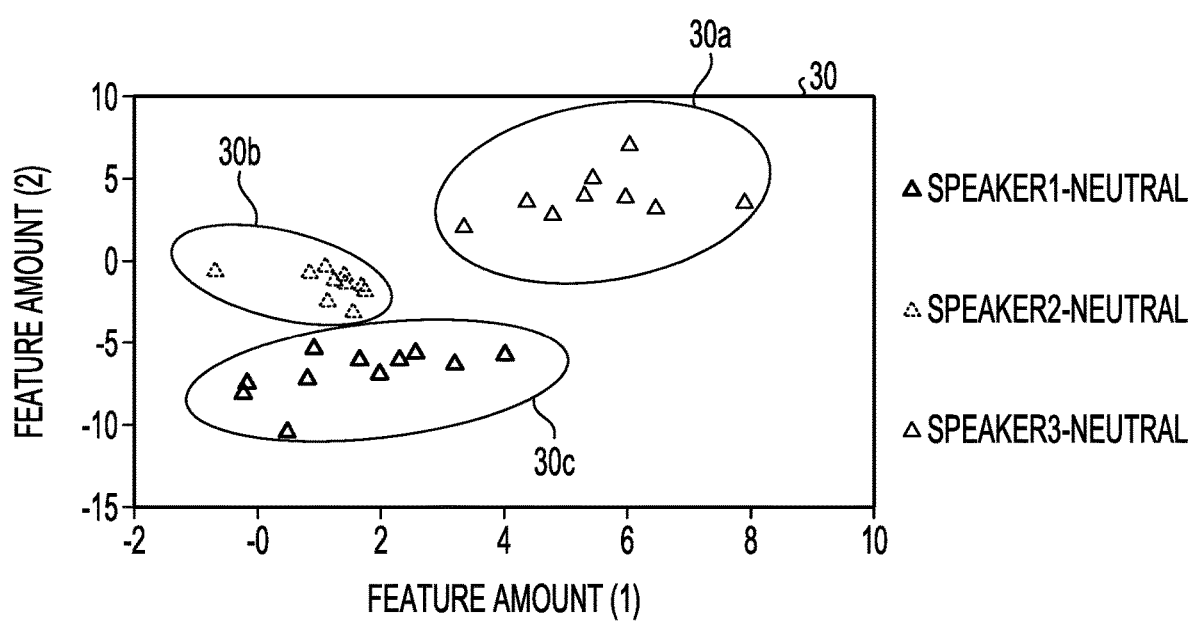
FIG. 7 is a view for explaining processing of a clustering unit according to the first embodiment.

The clustering unit 150 clusters the detected plurality of first feature amounts using a k-nearest neighbor method or the like. FIG. 7 is a view for explaining a process of the clustering unit according to the first embodiment. In FIG. 7, for simple explanation of a feature amount space, the 1024-dimensional feature amount is compressed into a two-dimensional (feature amount (1), feature amount (2)) feature amount space by principal component analysis, and the first feature amount (a point on the feature amount space determined by the feature amount) is displayed on the feature amount space. In the graph 30 of FIG. 7, the horizontal axis corresponds to the feature amount (1), and the vertical axis corresponds to the feature amount (2).

As illustrated in FIG. 7, when the clustering unit 150 clusters a plurality of first feature amounts using a k-nearest neighbor method or the like, the plurality of first feature amounts are classified into clusters 30a, 30b, and 30c. It is assumed that the clustering unit 150 holds the feature amounts of the voices of speakers 1, 2, and 3 in advance. The clustering unit 150 associates the speakers with the clusters based on distances between the voice feature amounts of speakers 1 to 3 and the clusters 30a to 30c (cluster centroids).

For example, assuming that a distance between the voice feature amount of speaker 1 and the centroid of the cluster 30c is smaller than a distance between the voice feature amount of speaker 1 and each of the centroids of the other clusters 30a and 30b, the clustering unit 150 associates the cluster 30c with speaker 1. Assuming that a distance between the voice feature amount of speaker 2 and the centroid of the cluster 30b is smaller than a distance between the voice feature amount of speaker 2 and each of the centroids of the other clusters 30a and 30c, the clustering unit 150 associates the cluster 30b with speaker 2. Assuming that a distance between the voice feature amount of speaker 3 and the centroid of the cluster 30a is smaller than a distance between the voice feature amount of speaker 3 and each of the centroids of the other clusters 30b and 30c, the clustering unit 150 associates the cluster 30a with speaker 3.

An example of the "vector calculation process" executed by the clustering unit 150 will be described. The clustering unit 150 detects a feature amount extracted from a frame in which the emotion is determined to be "sad" based on the plurality of feature amount information and the plurality of emotion information. In the following description, the feature amount extracted from the frame in which the emotion is determined to be "sad" is referred to as a "second feature amount."

The clustering unit 150 calculates "change vectors" of a plurality of second feature amounts for each speaker based on the average of the first feature amounts, according to Equation (8). In Equation (8), i represents an utterance section index (frame number) and is defined by $\forall i \in \{1, 2, \ldots, N\}$.

The sp(i) represents speaker allocation for an utterance section and is defined by $\forall sp(i) \in \{1, 2, 3\}$ when there are three speakers. The number of change vectors is calculated according to the utterance section index and the number of speakers.

$$V_{i,sp(i)} = x_i - \overline{X}_{sp(i)} \tag{8}$$

Similarly, the clustering unit 150 detects a feature amount extracted from a frame in which the emotion is determined to be "angry" based on the plurality of feature amount information and the plurality of emotion information. In the following description, the feature amount extracted from the frame in which the emotion is determined to be "angry" is referred to as a "third feature amount."

The clustering unit 150 calculates "change vectors" of a plurality of third feature amounts for each speaker based on the average of the first feature amounts, according to Equation (8). The number of change vectors is calculated according to the utterance section index and the number of speakers.

An example of the "similarity evaluation process" executed by the clustering unit 150 will be described. The clustering unit 150 evaluates the similarity between the directions of the plurality of change vectors. The similarity between the directions of the plurality of change vectors is evaluated by the objective function Sim expressed in Equation (9). A larger value of the objective function Sim indicates a more similarity between the directions of the change vectors. In Equation (9), "sp" represents a speaker and "f" represents an emotion. In the equation (9), cos (Vi_sp (i), Vj_sp (j)) represents the cosine similarity which is defined by Equation (10).

$$Sim_{i,sp(i)} = \qquad (9)$$

$$\sum_{sp,f} \left\{ \sum_{i,j \in \{1,2,\ldots N\}} \cos(V_{i,sp(i)}, V_{j,sp(j)}) \mid sp(i) = sp(j), f(i) = f(j) \right\}$$

$$\cos(a, b) = \frac{a \cdot b}{|a||b|} \qquad (10)$$

An example of "the speaker association process" executed by the clustering unit 150 will be described. The clustering unit 150 selects allocation of a speaker included in a frame (voice section) based on a criterion that maximizes the similarity between the change vector directions. The similarity is calculated according to Equation (9). The clustering unit 150 selects speaker allocation based on Equation (11). When there are three speakers, the speaker allocation is defined by $\forall sp(i) \in \{1, 2, 3\}$.

$$\widetilde{sp(i)} = \underset{sp(i)}{\arg\max} \{Sim_{i,sp(i)}\} \qquad (11)$$

The change vector calculated by Equation (8) has a pattern corresponding to a combination of feature amounts (second feature amount and third feature amount) and a speaker (cluster associated with the speaker). For example, change vectors having one second feature amount as an end point include a change vector having a start point as speaker 1, a change vector having a start point as speaker 2, and a change vector having a start point as speaker 3.

The clustering unit 150 calculates the cosine similarity based on each change vector for each pattern, as indicated in Equation (9), and specifies a pattern having the maximum cosine similarity for each feature amount (the second feature amount, the third feature amount). The clustering unit 150 determines a speaker of the feature amount based on the specified pattern. For example, when the change vector of the specified pattern starts from speaker 1, speaker 1 is allocated to a frame from which the feature amount that is the end point of the change vector is calculated. The clustering unit 150 allocates a speaker to each frame by executing the above process for each second feature amount and each third feature amount.

The clustering unit 150 generates user voice information in which each frame is associated with identification information of each speaker, and outputs the user voice information to the transmission unit 160. In addition, as described with reference to FIGS. 1 and 2, after clustering the second feature amount and the third feature amount, the clustering unit 150 may perform a process of setting a change vector and allocating a speaker to each frame.

The transmission unit 160 is a processing unit that transmits the user voice information to the server 26.

Figure 8:
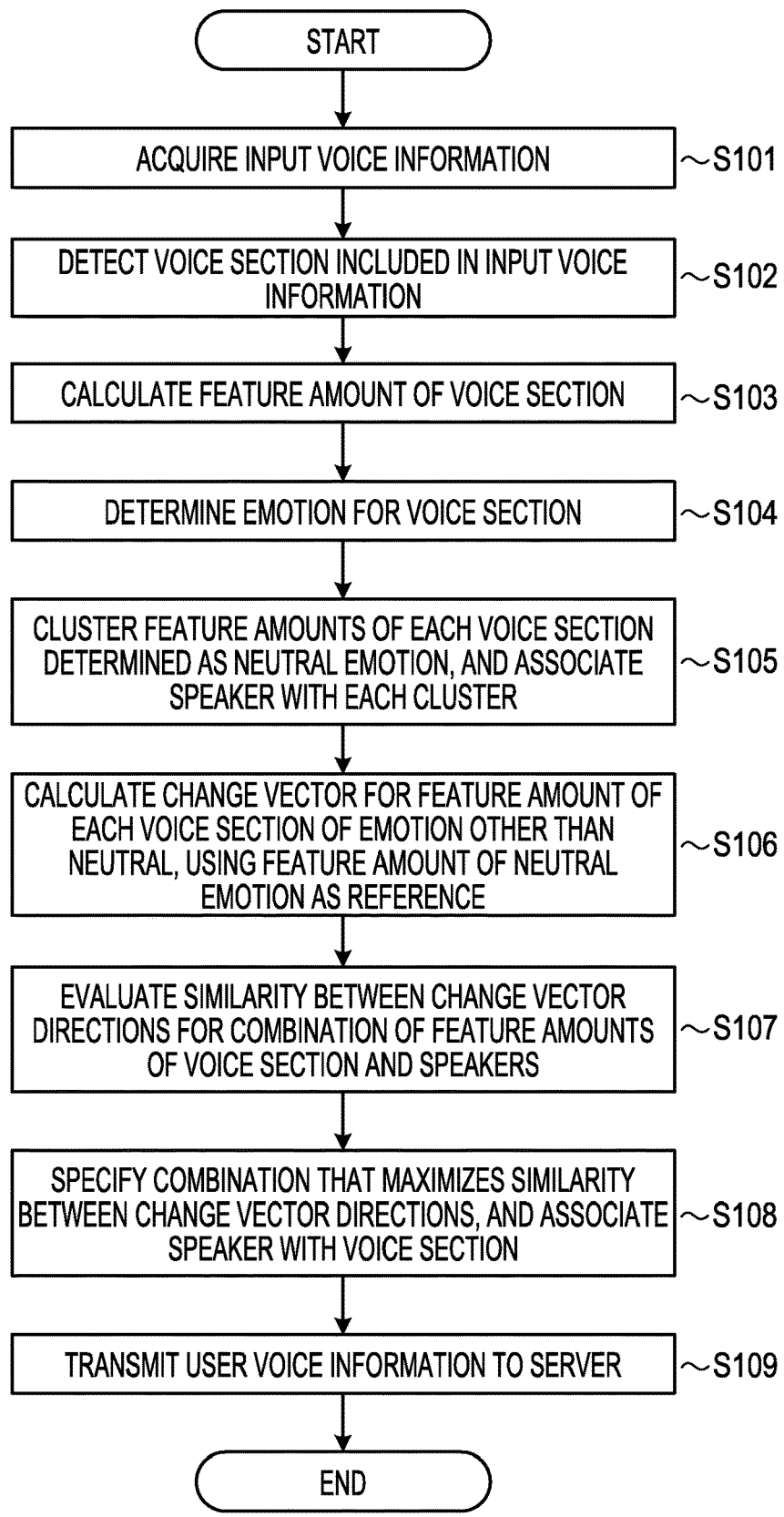
FIG. 8 is a flowchart illustrating the processing procedure of the voice processing apparatus according to the first embodiment.

Subsequently, an example of a processing procedure of the voice processing apparatus 100 according to the first embodiment will be described. FIG. 8 is a flowchart illustrating a processing procedure of the voice processing apparatus according to the first embodiment. As illustrated in FIG. 8, the acquisition unit 110 of the voice processing apparatus 100 acquires input voice information (operation S101). The detection unit 120 of the voice processing apparatus 100 detects a voice section included in the input voice information (operation S102).

The calculation unit 130 of the voice processing apparatus 100 calculates a feature amount of the voice section (operation S103). The determination unit 140 of the voice processing apparatus 100 determines an emotion for the voice section (operation S104). The clustering unit 150 of the voice processing apparatus 100 clusters the feature amounts of each voice section determined as neutral emotion, and associates a speaker with each cluster (operation S105).

The clustering unit 150 calculates a change vector for the feature amount of the voice section of emotion other than neutral, using the feature amount of the neutral emotion as a reference (start point) (operation S106). The clustering unit 150 evaluates the similarity between the change vector directions for a combination of the feature amounts of the voice section and the speakers (operation S107).

The clustering unit 150 specifies a combination that maximizes the similarity between the change vector directions, and associates a speaker with a voice section (operation S108). The transmission unit 160 of the voice processing apparatus 100 transmits the user voice information to the server 26 (operation S109).

Next, the effects of the voice processing apparatus 100 according to the first embodiment will be described. The voice processing apparatus 100 detects a voice section from the input voice information, calculates a feature amount from each voice section, and determines the emotion of a speaker. The voice processing apparatus 100 calculates a change vector of a feature vector accompanying an emotional change, determines a combination of a feature amount having the maximum similarity between the change vector directions and a speaker, and associates a voice section from which a feature amount is calculated with a speaker. Thus, even when the speaker's emotion changes, one speaker included in the plurality of speakers may be associated with the voice in the voice section.

The voice processing apparatus 100 clusters the first feature amounts in neutral, and calculates a plurality of change vectors with the average of the feature amounts of each cluster as a start point and with feature amounts other than neutral (second feature amount and third feature amount) as start points according to a combination of speakers and feature amounts. The voice processing apparatus 100 associates a voice section, which is a feature amount calculation source, with a speaker based on a combination of speakers and feature amounts having the maximum similarity between a plurality of change vector directions. As a result, the voice section of each speaker may be specified with high accuracy even with voices including emotional changes by a plurality of speakers. In addition, it is possible to specify when and who spoke about input voice information including the utterances of a plurality of speakers.

The voice processing apparatus 100 calculates a feature amount related to the harmonicity, periodicity or signal strength as a feature amount of a voice section. For example, the voice processing apparatus 100 calculates the spectrum autocorrelation, formant frequency, waveform autocorrelation, pitch frequency, frame power, SNR, and spectrum average power as the feature amounts of the voice section. By using such feature amounts, it is possible to accurately calculate a change vector accompanying a speaker's emotional change.

It has been illustrated that the voice processing apparatus 100 according to the first embodiment uses the cosine similarity when calculating the similarity between the plurality of change vector directions. However, the present disclosure is not limited thereto. For example, the voice processing apparatus 100 may calculate the similarity between the plurality of change vector directions based on the Pearson correlation coefficient.

Second Embodiment

Figure 9:
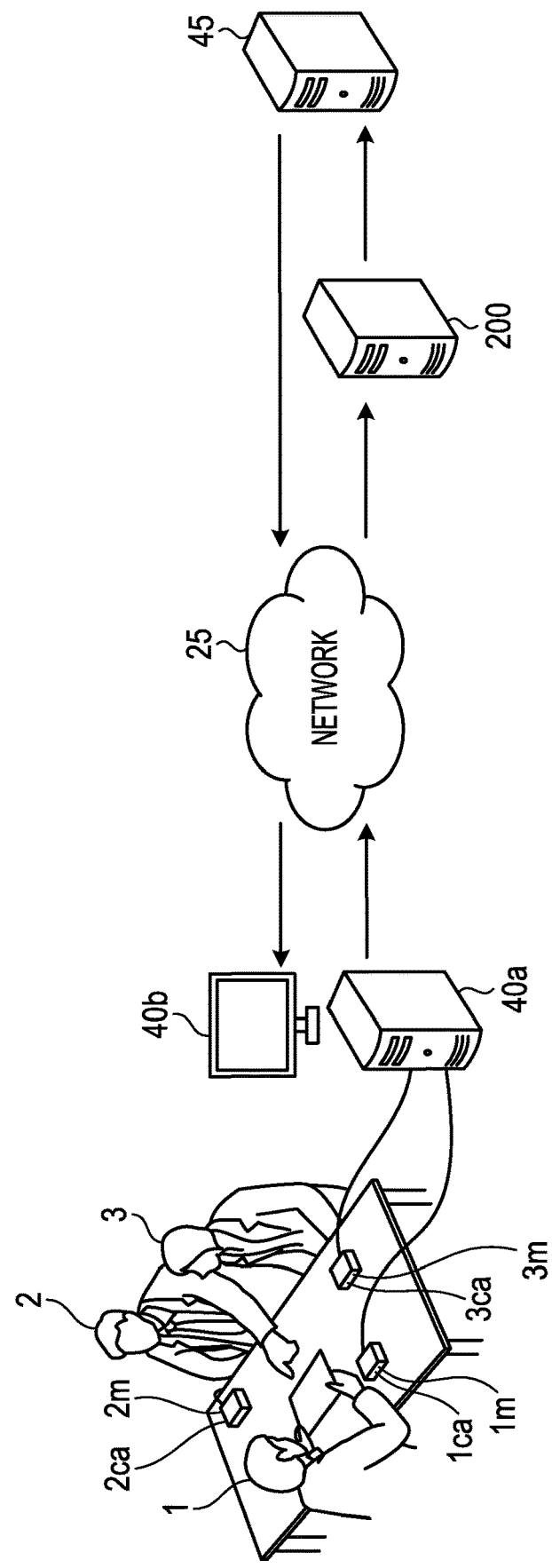
FIG. 9 is a view illustrating an example of a system according to a second embodiment.

FIG. 9 is a view illustrating an example of a system according to a second embodiment. As illustrated in FIG. 9, the system includes a recording device 40a, a display 40b, a server 45, and a voice processing apparatus 200. The recording device 40a, the display 40b, the server 45, and the voice processing apparatus 200 are connected to a network 25.

The recording device 40a is connected to cameras 1ca, 2ca, and 3ca and microphones 1m, 2m, and 3m. The camera 1ca captures a face image of speaker 1. The camera 2ca captures a face image of speaker 2. The camera 3ca captures a face image of speaker 3. The microphones 1m to 3m collect the conversations of speakers 1 to 3.

The recording device 40a converts voices collected using the microphones 1m to 3m into input voice information. In the second embodiment, as an example, the recording device 40a converts voices collected by any one of the microphones 1m to 3m into input voice information, and transmits the input voice information to the voice processing apparatus 200.

The recording device 40a generates face image information in which each face image captured by each of the cameras 1ca to 3ca is associated with speaker identification information. For example, the recording device 40a associates the face image captured by the camera 1ca with the speaker identification information of speaker 1. The recording device 40a associates the face image captured by the camera 2ca with the speaker identification information of speaker 2. The recording device 40a associates the face image captured by the camera 3ca with the speaker identification information of speaker 3. The recording device 40a transmits the face image information to the voice processing apparatus 200.

When the input voice information and the face image information are received from the recording device 40a, the voice processing apparatus 200 extracts a feature amount for each voice section of the input voice information. Further, the voice processing apparatus 200 determines the emotion of a speaker based on the face image information. The voice processing apparatus 200 clusters a plurality of feature amounts based on the change vector of a feature amount accompanying an emotional change, and associates a voice with a speaker for each voice section based on the clustering result. The voice processing apparatus 200 transmits user voice information in which the voice of each voice section is associated with the speaker identification information to the server 45.

When the user voice information is received, the server 45 analyzes the user voice information and generates response voice information for responding to the user voice information. The server 45 transmits the response voice information to the display 40b. The display 40b displays text information or the like corresponding to the response voice information.

Figure 10:
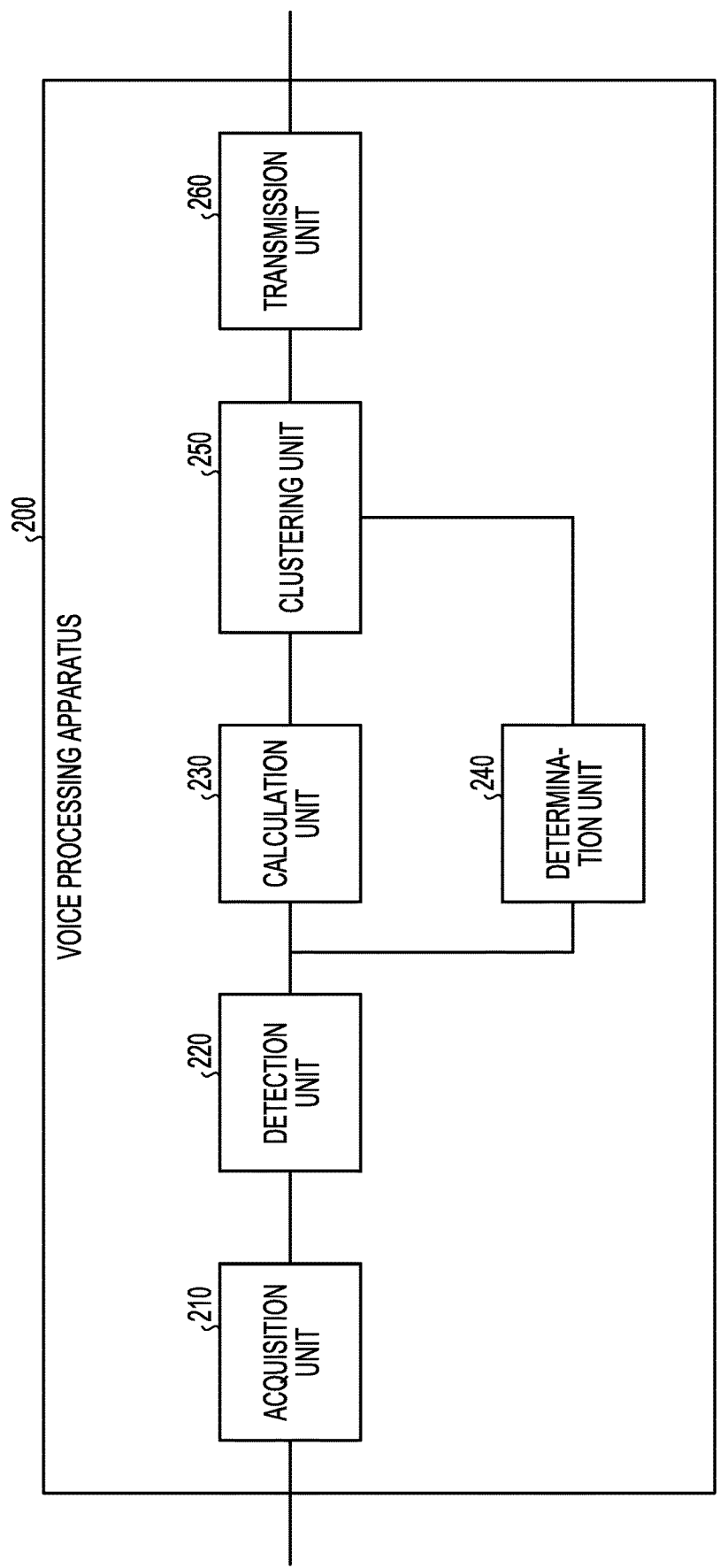
FIG. 10 is a functional block diagram illustrating the configuration of a voice processing apparatus according to the second embodiment.

Next, an example of the configuration of the voice processing apparatus 200 illustrated in FIG. 9 will be described. FIG. 10 is a functional block diagram illustrating the configuration of the voice processing apparatus according to the second embodiment. As illustrated in FIG. 10, the voice processing apparatus 200 includes an acquisition unit 210, a detection unit 220, a calculation unit 230, a determination unit 240, a clustering unit 250, and a transmission unit 260. Each of the units 210 to 260 is implemented by, for example, a CPU, an MPU or the like to execute a program stored in the voice processing apparatus 200 using a RAM or the like as a work area. Each of the units 210 to 260 may be implemented by an integrated circuit such as an ASIC, an FPGA or the like.

The acquisition unit 210 is a processing unit that acquires input voice information and face image information from the recording device 40a. The acquisition unit 210 outputs the acquired input voice information to the detection unit 220. The acquisition unit 210 outputs the acquired face image information to the determination unit 240.

The detection unit 220 is a processing unit that detects a plurality of voice sections from the input voice information. For example, the detection unit 220 divides the input voice information delimited by the voice sections into fixed-length frames, and outputs each of the frames to the calculation unit 230. The detection unit 220 allocates frame numbers in time series to the frames. Other processes related to the detection unit 220 are the same as the processes of the detection unit 120 of the first embodiment.

The calculation unit 230 is a processing unit that calculates a feature amount based on a voice signal included in a frame. The process of the calculation unit 230 to calculate the feature amount is the same as the process of the calculation unit 230 to calculate the feature amount. The calculation unit 230 generates feature amount information for each frame and outputs a plurality of feature amount information to the clustering unit 250.

The determination unit 240 is a processing unit that determines the emotion of a speaker based on the face image information. When a face image is input, the determination unit 240 determines the emotion of each speaker using a learned neural network that determines whether the emotion is "neutral," "sad" or "angry."

For example, the determination unit 240 aggregates the determination results of the emotions of speakers and makes a majority decision on "neutral," "sad," and "angry" to determine the representative emotion. For example, when it is determined that the emotions of speakers 1 and 2 are "neutral" and the emotion of speaker 3 is "sad," the determination unit 240 determines that the representative emotion is "neutral" since the number of "neutral"s is more. The determination unit 240 outputs the determination result (representative emotion determination result) to the clustering unit 250. For example, the determination unit 240 may determine the emotion for each speaker using the technique disclosed in Japanese Laid-Open Patent Publication No. 2008-146318. The determination unit 240 acquires the face image information and determines the emotions of the speakers at predetermined time intervals.

The clustering unit 250 is a processing unit that clusters a plurality of feature amounts based on a change vector from the feature amount of the voice section determined as neutral emotion to the feature amount of the voice section determined as sad or angry emotion. Based on the clustering result, the clustering unit 150 associates the voice section in which the feature amount is calculated, with a speaker.

For example, the clustering unit 250 executes a pre-clustering process, a vector calculation process, a similarity evaluation process, a feature amount correction process, and a speaker association process.

An example of the "pre-clustering process" executed by the clustering unit 250 will be described. The clustering unit 250 detects a feature amount calculated from a frame in which the emotion is determined to be "neutral" based on the plurality of feature amount information and the emotion determination result. For example, while the determination results on the emotions of speakers 1 to 3 are "neutral," the clustering unit 250 treats a frame of the feature amount information acquired from the calculation unit 230 as a frame in which the emotion is determined to be "neutral." In the following description, the feature amount extracted from the frame in which the emotion is determined to be "neutral" is referred to as a "first feature amount."

The clustering unit 150 clusters the detected plurality of first feature amounts using a k-nearest neighbor method or the like. FIG. 7 is a view for explaining a process of the clustering unit according to the first embodiment. The clustering unit 250 holds the feature amounts of the voices of speakers 1, 2, and 3 in advance, and associates the speakers with the clusters based on distances between the clusters and the voice feature amounts of speakers 1 to 3.

An example of the "vector calculation process" executed by the clustering unit 250 will be described. The clustering unit 250 detects a feature amount extracted from a frame in which the emotion is determined to be "sad" based on the plurality of feature amount information and the emotion determination result. For example, while the determination result on one of the emotions of speakers 1 to 3 is "sad" not "angry," the clustering unit 250 treats a frame of the feature amount information acquired from the calculation unit 230 as a frame in which the emotion is determined to be "sad." In the following description, the feature amount extracted from the frame in which the emotion is determined to be "sad" is referred to as a "second feature amount." The clustering unit 250 calculates "change vectors" of a plurality of second feature amounts for each speaker, using the average of the first feature amounts as a reference (start point), according to Equation (8).

The clustering unit 250 detects a feature amount extracted from a frame in which the emotion is determined to be "angry" based on the plurality of feature amount information and the emotion determination result. For example, while the determination result on one of the emotions of speakers 1 to 3 is "angry" not "sad," the clustering unit 250 treats a frame of the feature amount information acquired from the calculation unit 230 as a frame in which the emotion is determined to be "angry." In the following description, the feature amount extracted from the frame in which the emotion is determined to be "angry" is referred to as a "third feature amount." The clustering unit 250 calculates "change vectors" of a plurality of third feature amounts for each speaker, using the average of the first feature amounts as a reference (start point), according to Equation (8).

An example of the "similarity evaluation process" executed by the clustering unit 250 will be described. The clustering unit 250 evaluates the similarity between the directions of the plurality of change vectors. The similarity between the directions of the plurality of change vectors is evaluated by the objective function Sim expressed in Equation (9). A larger value of the objective function Sim indicates a more similarity between the directions of the change vectors.

The clustering unit 250 calculates the cosine similarity based on each change vector for each pattern according to a combination of speakers and feature amounts, as indicated in Equation (9), and specifies a pattern having the maximum cosine similarity for each feature amount (the second feature amount, the third feature amount).

An example of the "feature amount correction process" executed by the clustering unit 250 will be described. The clustering unit 250 calculates a first average vector by averaging a plurality of change vectors specified by a combination of each speaker having the maximum cosine similarity and each second feature amount. Further, the clustering unit 250 calculates a second average vector by averaging a plurality of change vectors specified by a combination of each speaker having the maximum cosine similarity and each third feature amount. For example, the clustering unit 250 calculates an average vector (the first average vector, the second average vector) according to Equation (12).

$$\overline{V_{sp,f}} = \text{average}\{V_{\overline{sp(i)}} | sp(i) = sp, f(i) = f\} \quad (12)$$

In Equation (12), i represents an utterance section index (frame number) and is defined by $\forall i \in \{1, 2, \ldots, N\}$. sp(i) represents speaker allocation for an utterance section and is defined by $\forall sp(i) \in \{1, 2, 3\}$ when there are three speakers. f represents an emotion (sad or angry) and is defined by $\forall i - \{1, 2\}$.

FIG. 11 is a view (1) for explaining the process of the clustering unit according to the second embodiment. In FIG. 11, a graph 50 represents a "feature amount before correction," and a graph 60 represents a "feature amount after correction." In FIG. 11, for simple explanation of a feature amount space, the 1024-dimensional feature amount is compressed into a two-dimensional (feature amount (1), feature amount (2)) feature amount space by principal component analysis, and the first feature amount (a point on the feature amount space determined by the feature amount) is displayed on the feature amount space. In the graphs 50 and 60 of FIG. 11, the horizontal axis corresponds to the feature amount (1), and the vertical axis corresponds to the feature amount (2).

For example, in the graph 50 of FIG. 11, each feature amount included in a cluster 50a is the first feature amount of the voice section associated with speaker 3. Each feature amount included in a cluster 50b is the second feature amount of the voice section associated with speaker 2. Each feature amount included in a cluster 50c is the second feature amount of the voice section associated with speaker 1.

Each feature amount included in a region 51a is a change vector with the first feature amount of speaker 3 as a start point among a plurality of change vectors having the maximum similarity specified in the similarity evaluation process. This feature amount is the second feature amount that is the end point of the change vector. A vector 7a is a first average vector obtained by averaging a plurality of change vectors from the centroid of the cluster 50a to each second feature amount of the region 51a.

Each feature amount included in a region 51b is a change vector with the first feature amount of speaker 2 as a start point among a plurality of change vectors having the maximum similarity specified in the similarity evaluation process. This feature amount is the second feature amount that is the end point of the change vector. A vector 7b is a first average vector obtained by averaging a plurality of change vectors from the centroid of the cluster 50b to each second feature amount of the region 51b.

Each feature amount included in a region 51c is a change vector with the first feature amount of speaker 1 as a start point among a plurality of change vectors having the maximum similarity specified in the similarity evaluation process. This feature amount is the second feature amount that is the end point of the change vector. A vector 7c is a first average vector obtained by averaging a plurality of change vectors from the centroid of the cluster 50c to each second feature amount of the region 51c.

Each feature amount included in a region 52a is a change vector with the first feature amount of speaker 3 as a start point among a plurality of change vectors having the maximum similarity specified in the similarity evaluation process. This feature amount is the third feature amount that is the end point of the change vector. A vector 8*a* is a second average vector obtained by averaging a plurality of change vectors from the centroid of the cluster 50*a* to each third feature amount of the region 52*a*.

Each feature amount included in a region 52*b* is a change vector with the first feature amount of speaker 2 as a start point among a plurality of change vectors having the maximum similarity specified in the similarity evaluation process. This feature amount is the third feature amount that is the end point of the change vector. A vector 8*b* is a second average vector obtained by averaging a plurality of change vectors from the centroid of the cluster 50*b* to each third feature amount of the region 52*b*.

Each feature amount included in a region 52*c* is a change vector with the first feature amount of speaker 1 as a start point among a plurality of change vectors having the maximum similarity specified in the similarity evaluation process. This feature amount is the third feature amount that is the end point of the change vector. A vector 8*c* is a second average vector obtained by averaging a plurality of change vectors from the centroid of the cluster 50*c* to each third feature amount of the region 52*c*.

The clustering unit 250 performs correction for moving each second feature amount included in the region 51*a* in the direction opposite to the vector 7*a*. The clustering unit 250 performs correction for moving each second feature amount included in the region 51*b* in the direction opposite to the vector 7*b*. The clustering unit 250 performs correction for moving each second feature amount included in the region 51*c* in the direction opposite to the vector 7*c*.

The clustering unit 250 performs correction for moving each third feature amount included in the region 52*a* in the direction opposite to the vector 8*a*. The clustering unit 250 performs correction for moving each second feature amount included in the region 52*b* in the direction opposite to the vector 8*b*. The clustering unit 250 performs correction for moving each second feature amount included in the region 52*c* in the direction opposite to the vector 8*c*.

When the clustering unit 250 performs the above correction, each feature amount included in the graph 50 is corrected to each feature amount indicated in the graph 60.

Figure 12:
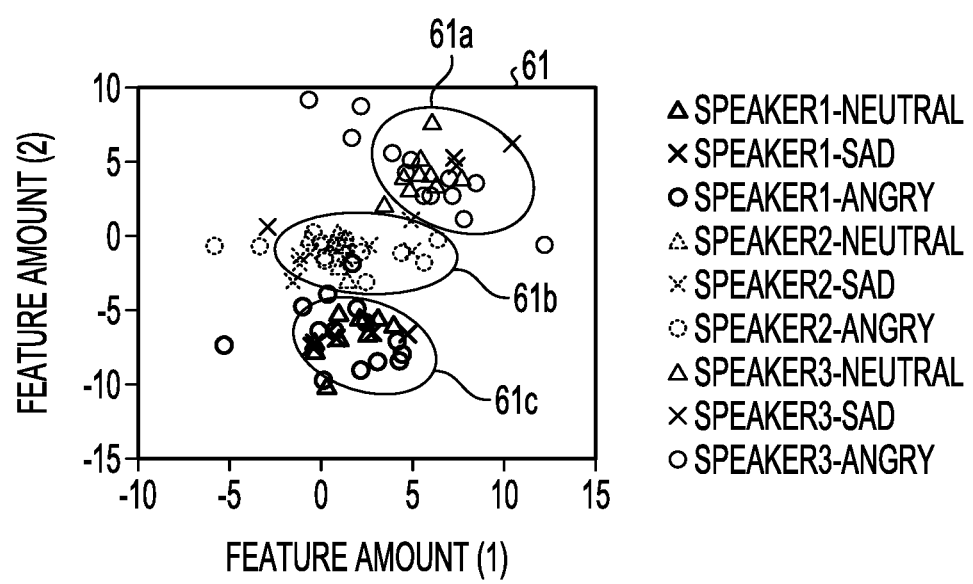
FIG. 12 is a view (2) for explaining processing of a clustering unit according to the second embodiment.

An example of the "speaker association process" executed by the clustering unit 250 will be described. The clustering unit 250 clusters the feature amounts of the voice section determined as sad or angry among the corrected feature amounts using a k-nearest neighbor method or the like. FIG. 12 is a view (2) for explaining the process of the clustering unit according to the second embodiment. In FIG. 12, for simple explanation of a feature amount space, the 1024-dimensional feature amount is compressed into a two-dimensional (feature amount (1), feature amount (2)) feature amount space by principal component analysis, and the first feature amount (a point on the feature amount space determined by the feature amount) is displayed on the feature amount space. In a graph 30 of FIG. 12, the horizontal axis corresponds to the feature amount (1), and the vertical axis corresponds to the feature amount (2).

As illustrated in FIG. 12, when the clustering unit 250 clusters a plurality of feature amounts using a k-nearest neighbor method or the like, the plurality of feature amounts are classified into clusters 61*a*, 61*b*, and 61*c*. It is assumed that the clustering unit 250 holds the feature amounts of the voices of speakers 1, 2, and 3 in advance. The clustering unit 250 associates the speakers with the clusters based on distances between the voice feature amounts of speakers 1 to 3 and the clusters 61*a* to 61*c* (cluster centroids).

For example, assuming that a distance between the voice feature amount of speaker 1 and the centroid of the cluster 61*c* is smaller than a distance between the voice feature amount of speaker 1 and each of the centroids of the other clusters 61*a* and 61*b*, the clustering unit 250 associates the cluster 61*c* with speaker 1. Assuming that a distance between the voice feature amount of speaker 2 and the centroid of the cluster 61*b* is smaller than a distance between the voice feature amount of speaker 2 and each of the centroids of the other clusters 61*a* and 61*c*, the clustering unit 250 associates the cluster 61*b* with speaker 2. Assuming that a distance between the voice feature amount of speaker 3 and the centroid of the cluster 61*a* is smaller than a distance between the voice feature amount of speaker 3 and each of the centroids of the other clusters 61*b* and 61*c*, the clustering unit 250 associates the cluster 61*a* with speaker 3.

The clustering unit 250 associates each frame (voice section) in which each feature amount included in the cluster 61*c* is calculated with speaker 1. The clustering unit 250 associates each frame (voice section) in which each feature amount included in the cluster 61*b* is calculated with speaker 2. The clustering unit 250 associates each frame (voice section) in which each feature amount included in the cluster 61*a* is calculated with speaker 1. The clustering unit 250 generates user voice information in which each frame is associated with each speaker's identification information, and outputs the user voice information to the transmission unit 260.

The transmission unit 260 is a processing unit that transmits the user voice information to the server 45.

Figure 13:
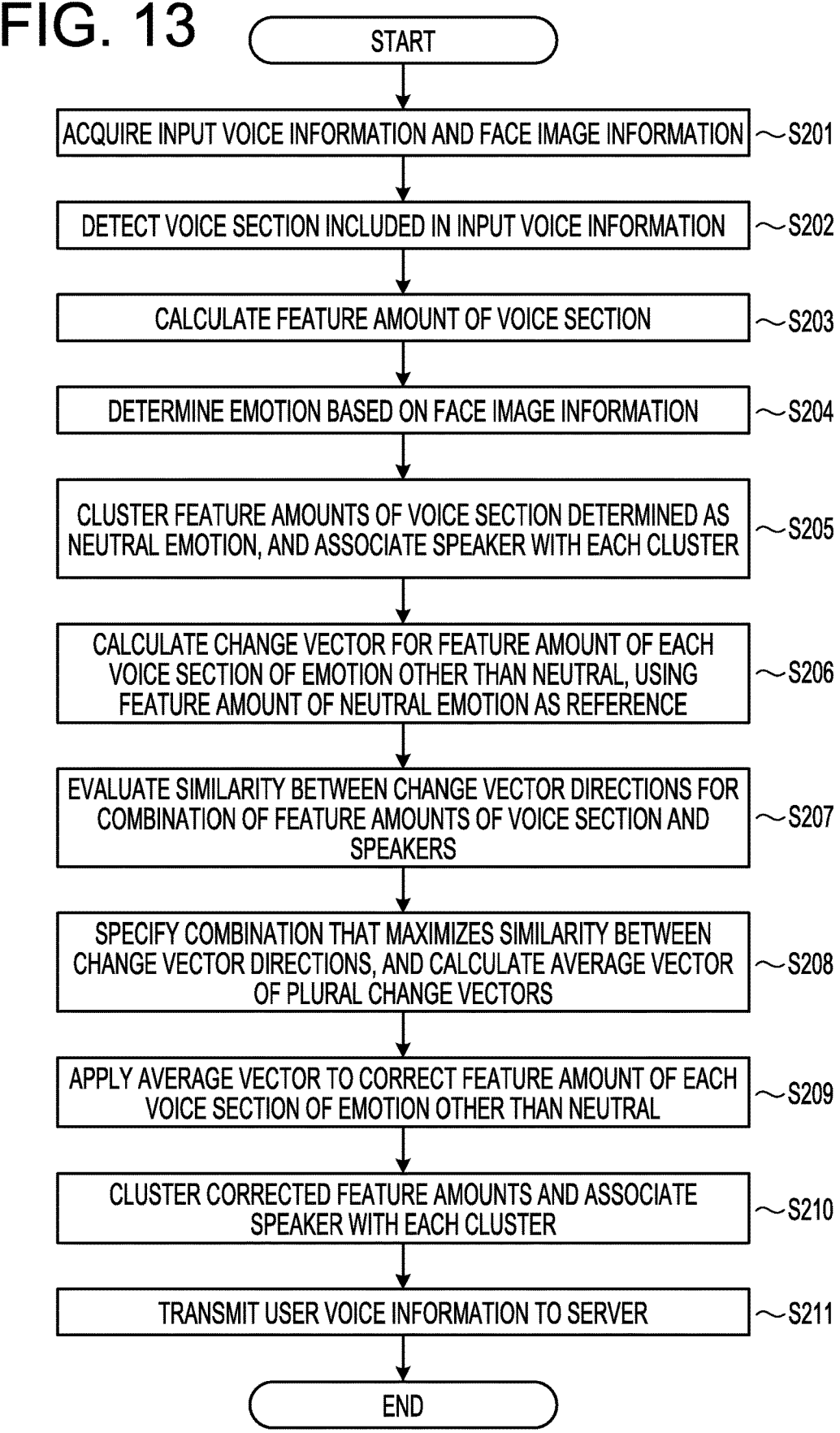
FIG. 13 is a flowchart illustrating the processing procedure of the voice processing apparatus according to the second embodiment.

Next, an example of the processing procedure of the voice processing apparatus 200 according to the second embodiment will be described. FIG. 13 is a flowchart illustrating the processing procedure of the voice processing apparatus according to the second embodiment. As illustrated in FIG. 13, the acquisition unit 210 of the voice processing apparatus 200 acquires input audio information and face image information (operation S201).

The detection unit 220 of the voice processing apparatus 200 detects a voice section included in the input voice information (operation S202). The calculation unit 230 calculates a feature amount of the voice section (operation S203). The determination unit 240 of the voice processing apparatus 200 determines an emotion based on the face image information (operation S204).

The clustering unit 250 of the voice processing apparatus 200 clusters the feature amounts of a voice section in which the emotion is determined as neutral, and associates a speaker with each cluster (operation S205). The clustering unit 250 calculates a change vector with the feature amount of the neutral emotion as a reference for the feature amount of each voice section in which the emotion is other than neutral (operation S206).

The clustering unit 250 evaluates the similarity between the directions of change vectors for combinations of feature amounts of the voice section and speakers (operation S207). The clustering unit 250 specifies a combination that maximizes the similarity between the directions of change vectors, and calculates an average vector of the plurality of change vectors (operation S208).

The clustering unit 250 applies the average vector to correct the feature amount of each voice section in which the emotion is other than neutral (operation S209). The clustering unit 250 clusters the corrected feature amounts and associates a speaker with each cluster (operation S210). The transmission unit 260 of the voice processing apparatus 200 transmits user voice information to the server 45 (operation S211).

Next, the effects of the voice processing apparatus 200 according to the second embodiment will be described. Since the voice processing apparatus 200 determines the emotion of a speaker based on the face image of the speaker, even when it is difficult to determine the emotion using the input voice information, the voice processing apparatus 200 is able to determine an emotion corresponding to each voice section.

The voice processing apparatus 200 calculates an average vector using a plurality of change vectors with the maximum similarity specified in the similarity evaluation process, and corrects feature amounts of emotions other than neutral using the average vector. Then, the voice processing apparatus 200 associates the feature amounts with speakers by clustering the corrected feature amounts. Thus, even when the speaker's emotion changes, one speaker included in the plurality of speakers may be associated with the voice in the voice section.

In addition, in the second embodiment, as an example, the voice processing apparatus 200 determines the emotion of a speaker based on the face image information. However, the present disclosure is not limited thereto. For example, in the same manner as the first embodiment, the emotion may be determined based on a voice section of the input voice information. Further, the voice processing apparatus 200 may determine the emotion of the speaker using the face image information and the input voice information. For example, the voice processing apparatus 200 may perform a process of setting a priority for each of the face image information and the input voice information and giving a priority to the determination result of the information with higher priority when the determination result between the face image information and the input voice information differs.

Third Embodiment

Figure 14:
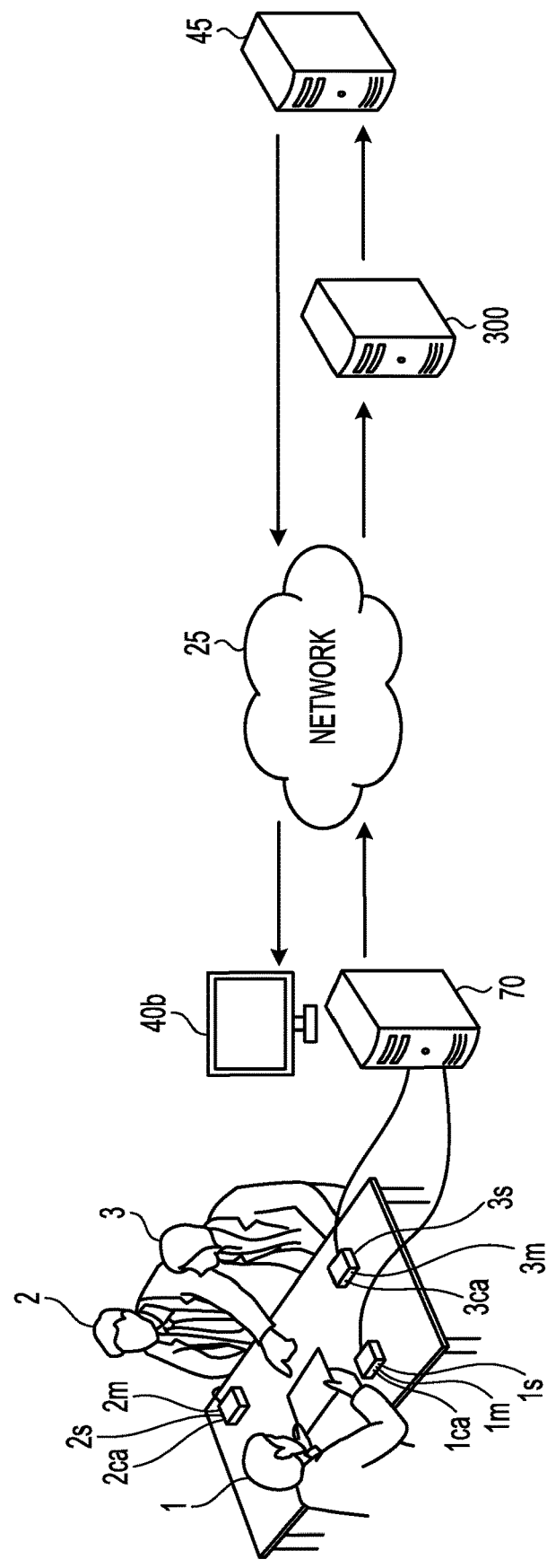
FIG. 14 is a view illustrating an example of a system according to a third embodiment.

FIG. 14 is a view illustrating an example of a system according to a third embodiment. As illustrated in FIG. 14, the system includes a recording device 70, a display 40b, a server 45, and a voice processing apparatus 300. The recording device 70a, the display 40b, the server 45, and the voice processing apparatus 300 are connected to a network 25.

The recording device 70 is connected to cameras 1ca, 2ca, and 3ca, microphones 1m, 2m, and 3m and biosensors 1s, 2s, and 3s. The camera 1ca captures a face image of speaker 1. The camera 2ca captures a face image of speaker 2. The camera 3ca captures a face image of speaker 3. The microphones 1m to 3m collect the conversations of speakers 1 to 3.

The biosensor 1s measures biological information such as a heartbeat of speaker 1. The biosensor 2s measures biological information such as a heartbeat of speaker 2. The biosensor 3s measures biological information such as a heartbeat of speaker 3.

The recording device 70 converts voices collected using the microphones 1m to 3m into input voice information. In the third embodiment, as an example, the recording device 70 converts voices collected by any one of the microphones 1m to 3m into input voice information, and transmits the input voice information to the voice processing apparatus 300.

The recording device 70 generates "face image information" in which each face image captured by each of the cameras 1ca to 3ca is associated with speaker identification information. For example, the recording device 70 associates the face image captured by the camera 1ca with the speaker identification information of speaker 1. The recording device 70 associates the face image captured by the camera 2ca with the speaker identification information of speaker 2. The recording device 70 associates the face image captured by the camera 3ca with the speaker identification information of speaker 3. The recording device 70 transmits the face image information to the voice processing apparatus 300.

The recording device 70 generates "biosensor information" in which the biological information measured by each of the biosensors 1s to 3s is associated with the speaker identification information. For example, the recording device 70 associates the biological information measured by the biosensor 1s with the speaker identification information of speaker 1. The recording device 70 associates the biological information measured by the biosensor 2s with the speaker identification information of speaker 2. The recording device 70 associates the biological information measured by the biosensor 3s with the speaker identification information of speaker 3. The recording device 70 transmits the biosensor information to the voice processing apparatus 300.

When the input voice information, the face image information, and the biosensor information are received from the recording device 70, the voice processing apparatus 300 extracts a feature amount for each voice section of the input voice information. Further, the voice processing apparatus 300 determines the emotion of a speaker based on the face image information and the biosensor information. The voice processing apparatus 300 clusters a plurality of feature amounts based on the change vector of a feature amount accompanying an emotional change, and associates a voice with a speaker for each voice section based on the clustering result. The voice processing apparatus 300 transmits user voice information in which the voice of each voice section is associated with the speaker identification information to the server 45.

When the user voice information is received, the server 45 analyzes the user voice information and generates response voice information for responding to the user voice information. The server 45 transmits the response voice information to the display 40b. The display 40b displays text information or the like corresponding to the response voice information.

Figure 15:
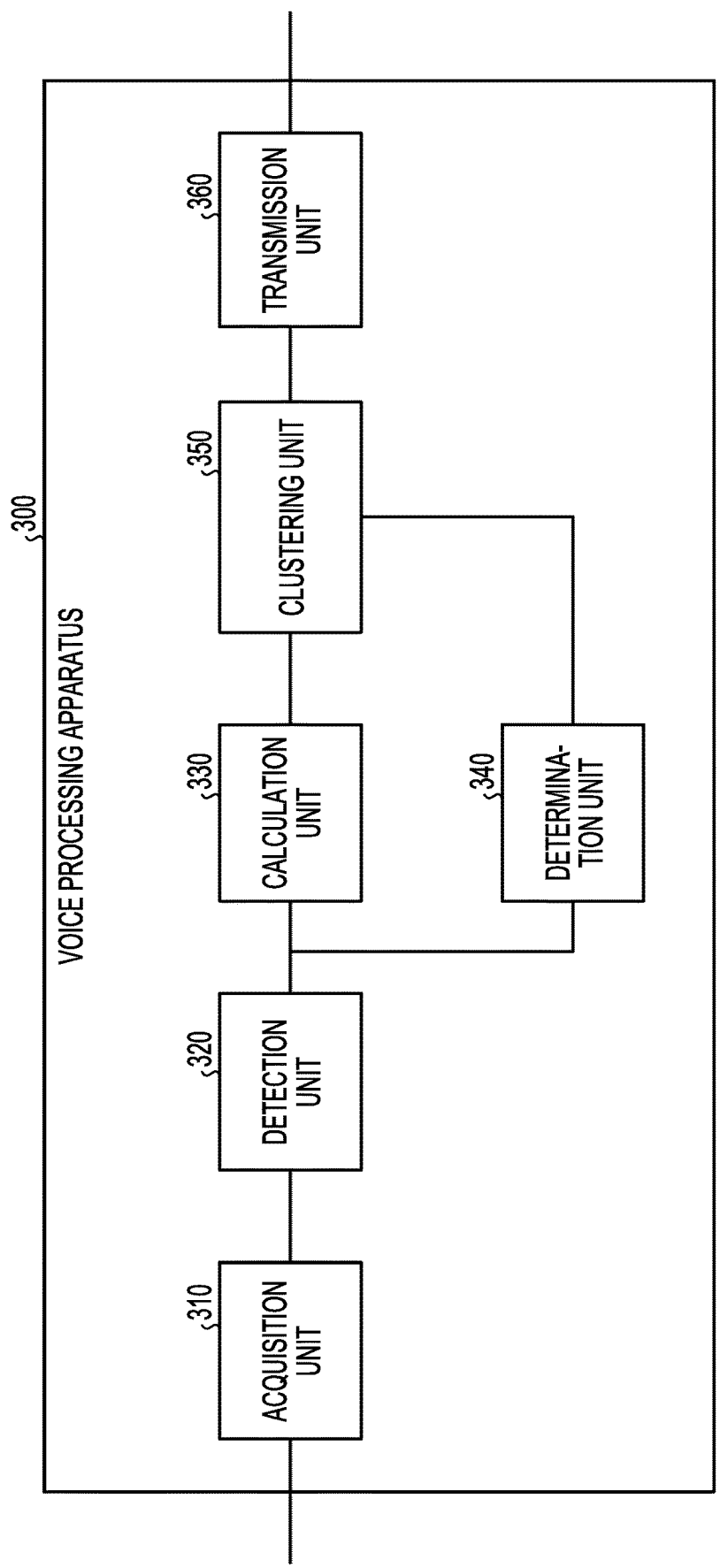
FIG. 15 is a functional block diagram illustrating the configuration of a voice processing apparatus according to the third embodiment.

Next, an example of the configuration of the voice processing apparatus 300 illustrated in FIG. 14 will be described. FIG. 15 is a functional block diagram illustrating the configuration of the voice processing apparatus according to the third embodiment. As illustrated in FIG. 15, the voice processing apparatus 300 includes an acquisition unit 310, a detection unit 320, a calculation unit 330, a determination unit 340, a clustering unit 350, and a transmission unit 360. Each of the units 310 to 360 is implemented by, for example, a CPU, an MPU or the like to execute a program stored in the voice processing apparatus 300 using a RAM or the like as a work area. Each of the units 310 to 360 may be implemented by an integrated circuit such as an ASIC, an FPGA or the like.

The acquisition unit 310 is a processing unit that acquires input voice information, face image information, and biosensor information from the recording device 70. The acquisition unit 310 outputs the acquired input voice information to the detection unit 320. The acquisition unit 310 outputs the acquired face image information, and biosensor information to the determination unit 340.

The detection unit 320 is a processing unit that detects a plurality of voice sections from the input voice information. For example, the detection unit 320 divides the input voice information delimited by the voice sections into fixed-length frames, and outputs each of the frames to the calculation unit 330. The detection unit 320 allocates frame numbers in time series to the frames. Other processes related to the detection unit 320 are the same as the processes of the detection unit 120 of the first embodiment.

The calculation unit 330 is a processing unit that calculates a feature amount based on a voice signal included in a frame. For example, the calculation unit 330 calculates a feature amount by inputting an acoustic feature parameter to a neural network (NN). The neural network is an example of a deep learning model.

The acoustic feature parameter includes a spectrum, a pitch frequency, a formant frequency and the like. The process of the calculation unit 330 to calculate the spectrum, the pitch frequency, and the formant frequency is the same as the process of the calculation unit 130 of the first embodiment to calculate the spectrum, the pitch frequency, and the formant frequency.

The NN used by the calculation unit 330 is a learned NN. Such NN is learned in advance by a learning device (not shown) using learning data in which an acoustic feature parameter is associated with correct answer data of a speaker. The NN is constituted by an input layer, a hidden layer, and an output layer. When the acoustic feature parameter is input to the input layer, the probability of the speaker corresponding to the acoustic feature parameter is output from the output layer. When the acoustic feature parameter is input to the NN input layer, the calculation unit 330 acquires information output from a layer immediately before the output layer as a feature amount of the acoustic feature parameter. The calculation unit 330 may perform the NN learning using the technique disclosed in Japanese Laid-Open Patent Publication No. 2018-139071.

The calculation unit 330 calculates the above-described feature amount for each frame, and outputs the calculated feature amount to the clustering unit 350. The calculation unit 330 outputs, to the clustering unit 350, "feature amount information" in which a frame number is associated with a feature amount calculated from a frame having this frame number.

The determination unit 140 is a processing unit that determines the emotion of a speaker based on the face image information and the biosensor information. First, the determination unit 340 determines the emotion of each speaker based on the face image information, determines the emotion of each speaker based on the biosensor information, and performs final emotion determination. The process of the determination unit 340 to determine the emotion of each speaker based on the face image information is the same as the process of the determination unit 240 described in the second embodiment.

The process of the determination unit 340 to determine the emotion of each speaker based on the biosensor information will be described. The determination unit 340 calculates the degree of arousal and the degree of comfort of a speaker based on the characteristics of the heartbeat of the speaker included in the biosensor information. The determination unit 340 determines the emotion of the speaker based on a table that associates the degree of arousal, the degree of comfort and the emotion. The determination unit 340 may determine the emotion for each speaker using the technique disclosed in Japanese Laid-Open Patent Publication No. 2017-144222.

The determination unit 340 aggregates the determination results of the emotions of speakers obtained from the face image information and the determination results of the emotions of speakers obtained from the biosensor information and makes a majority decision on "neutral," "sad," and "angry" to determine the representative emotion. For example, assume that the emotions of speakers 1 and 2 determined by the face image information are "neutral," the emotion of speaker 3 determined by the face image information is "sad," the emotions of speakers 1 and 3 determined by the biosensor information are "neutral," and the emotion of speaker 2 determined by the biosensor information is "angry." In this case, since the number of neutral emotions is the largest, the determination unit 340 determines that the representative emotion is "neutral." The determination unit 340 outputs the determination result (representative emotion determination result) to the clustering unit 350.

The clustering unit 350 is a processing unit that clusters a plurality of feature amounts based on a change vector from the feature amount of the voice section when the emotion is determined as neutral to the feature amount of the voice section when the emotion is determined as sad or angry. Based on the clustering result, the clustering unit 350 associates the voice section in which the feature amount is calculated with a speaker. The clustering unit 350 generates user voice information in which each voice section (frame) is associated with the identification information of each speaker, and outputs the user voice information to the transmission unit 360. The process of the clustering unit 350 is the same as the process of the clustering unit 250 described in the second embodiment.

The transmission unit 360 is a processing unit that transmits the user voice information to the server 45.

Figure 16:
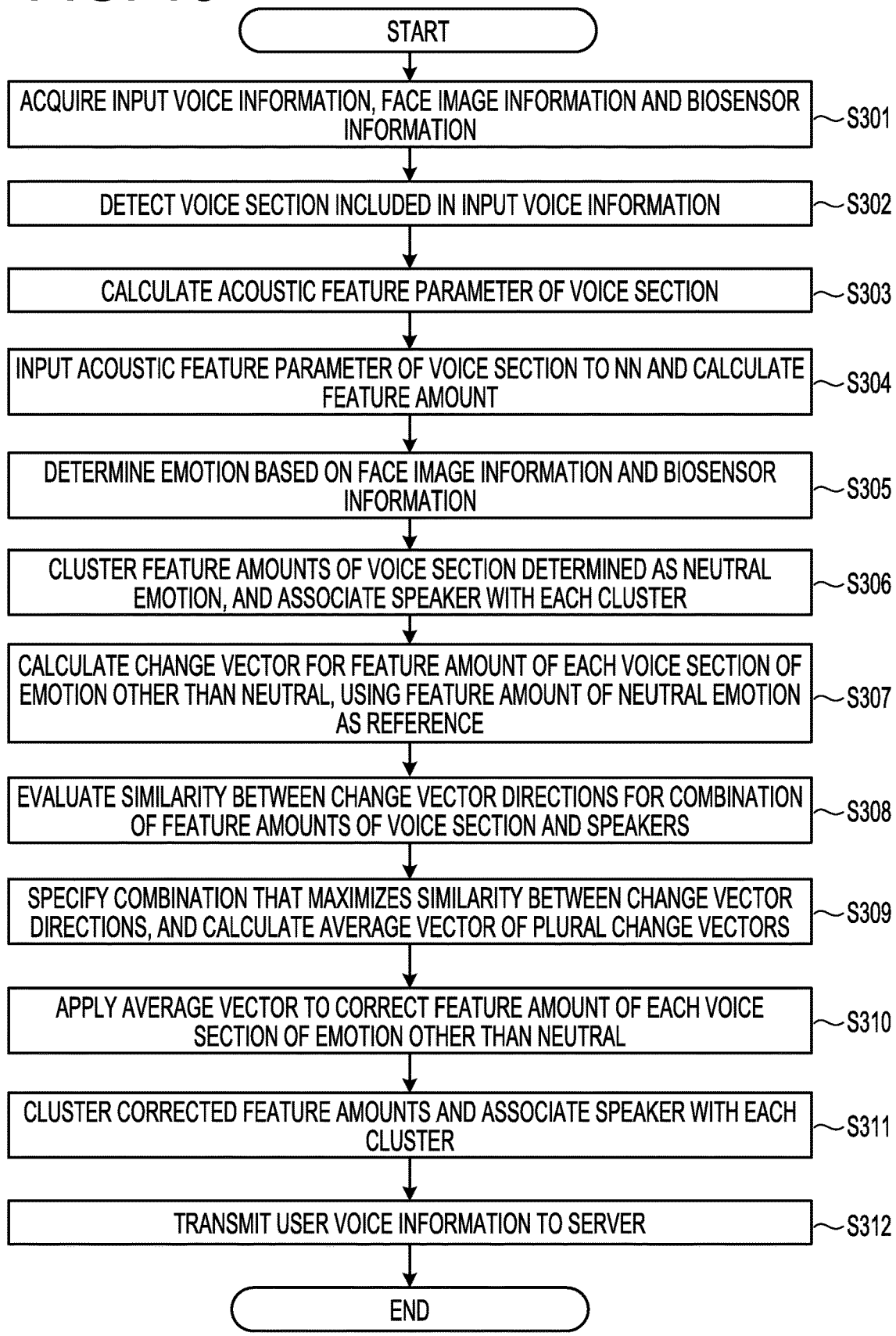
FIG. 16 is a flowchart illustrating the processing procedure of the voice processing apparatus according to the third embodiment.

Next, an example of the processing procedure of the voice processing apparatus 300 according to the third embodiment will be described. FIG. 16 is a flowchart illustrating the processing procedure of the voice processing apparatus according to the third embodiment. As illustrated in FIG. 16, the acquisition unit 310 of the voice processing apparatus 300 acquires input audio information, face image information and biosensor information (operation S301).

The detection unit 320 of the voice processing apparatus 300 detects a voice section included in the input voice information (operation S302). The calculation unit 330 calculates an acoustic feature parameter of the voice section (operation S303). The calculation unit 330 inputs the acoustic feature parameter of the voice section to the NN and calculates a feature amount (operation S304). The determination unit 340 of the voice processing apparatus 300 determines an emotion based on the face image information and the biosensor information (operation S305).

The clustering unit 350 of the voice processing apparatus 300 clusters the feature amounts of a voice section in which the emotion is determined as neutral, and associates a speaker with each cluster (operation S306). The clustering unit 350 calculates a change vector with the feature amount of the neutral emotion as a reference for the feature amount of each voice section in which the emotion is other than neutral (operation S307).

The clustering unit 350 evaluates the similarity between the directions of change vectors for combinations of feature amounts of the voice section and speakers (operation S308). The clustering unit 350 specifies a combination that maximizes the similarity between the directions of change vectors, and calculates an average vector of the plurality of change vectors (operation S309).

The clustering unit 350 applies the average vector to correct the feature amount of each voice section in which the emotion is other than neutral (operation S310). The clustering unit 350 clusters the corrected feature amounts and associates a speaker with each cluster (operation S311). The transmission unit 360 of the voice processing apparatus 300 transmits user voice information to the server 45 (operation S312).

Next, the effects of the voice processing apparatus 300 according to the third embodiment will be described. Since the voice processing apparatus 300 determines the emotion of a speaker based on the face image and the biological information of the speaker, even when it is difficult to determine the emotion using the input voice information, the voice processing apparatus 300 is able to determine an emotion corresponding to each voice section.

The voice processing apparatus 300 uses a learned NN to calculate the feature amount of the voice section. Therefore, it is possible to calculate a feature amount in which uncertain elements such as noise included in the input voice information are absorbed by the NN.

In addition, in the third embodiment, as an example, the voice processing apparatus 300 determines the emotion of a speaker based on the face image information and the biosensor information. However, the present disclosure is not limited thereto. For example, as in the first embodiment, the voice processing apparatus 300 may determine the emotion based on the voice section of the input voice information. Further, the voice processing apparatus 300 may determine the emotion of the speaker using the input voice information, the face image information, and the biosensor information. For example, the voice processing apparatus 300 may perform a majority decision on the emotion determination result of the face image information, the emotion determination result of the biosensor information, and the emotion determination result of the input voice information to determine the overall emotion.

The calculation unit 330 of the voice processing apparatus 300 calculates the feature amount of the voice section using the NN. However, the present disclosure is not limited thereto. For example, the calculation unit 330 may calculate the feature amount in the same way as the calculation unit 130 described in the first embodiment.

Figure 17:
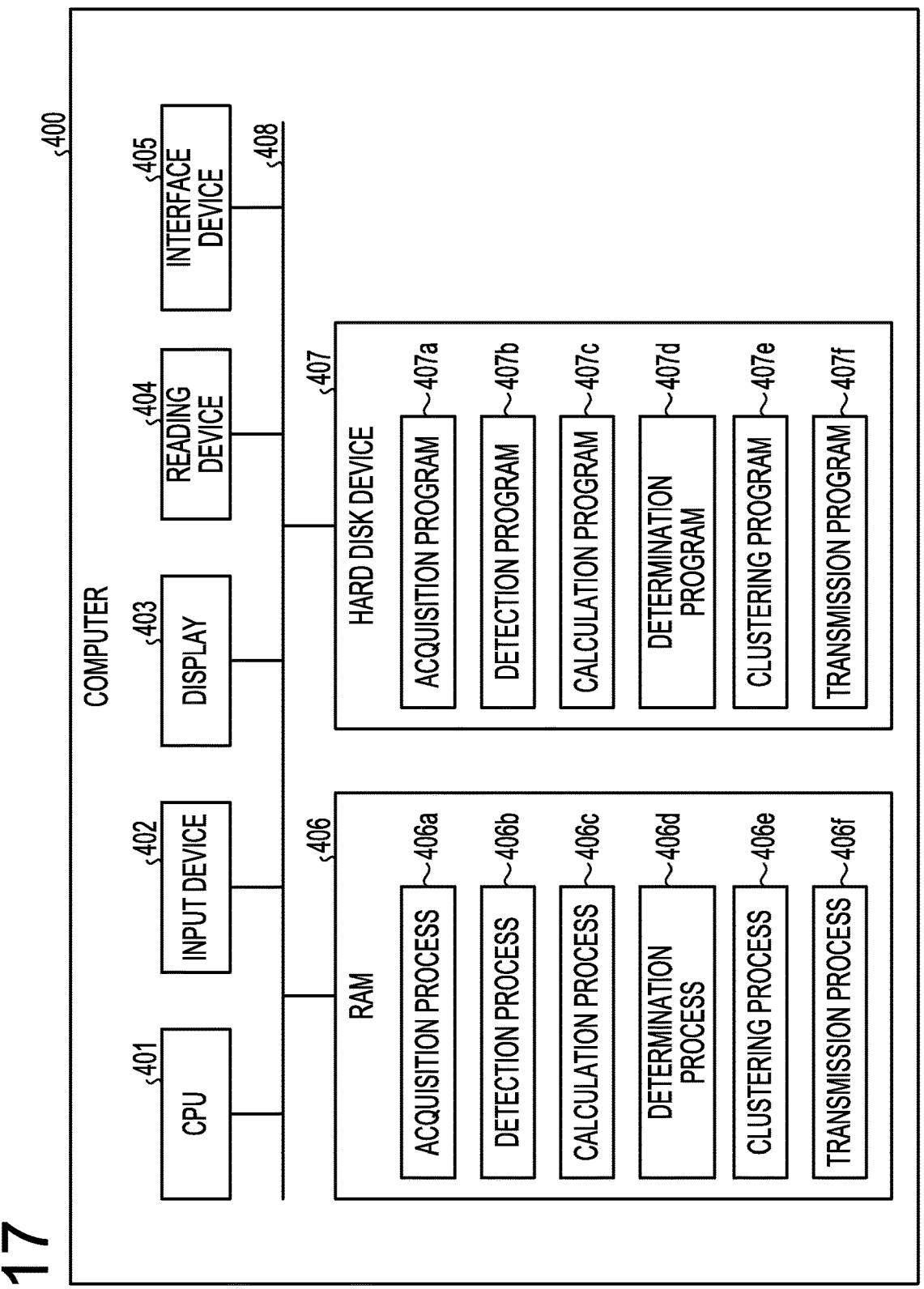
FIG. 17 is a view illustrating an example of a hardware configuration of a computer that realizes the same functions as the voice processing apparatuses according to the present embodiments.

Next, an example of a hardware configuration of a computer that realizes the same functions as the voice processing apparatuses 100, 200, and 300 described in the present embodiments will be described. FIG. 17 is a view illustrating an example of a hardware configuration of a computer that realizes the same functions as the voice processing apparatuses according to the present embodiments.

As illustrated in FIG. 17, the computer 400 includes a CPU 401 that executes various arithmetic processes, an input device 402 that receives data from a user, and a display 403. The computer 400 further includes a reading device 404 that reads a program or the like from a storage medium, and an interface device 405 that exchanges data with an external device or the like via a wired or wireless network. The computer 400 further includes a RAM 406 that temporarily stores a variety of information, and a hard disk device 407. The devices 401 to 407 are connected to a bus 408.

The hard disk device 407 includes an acquisition program 407a, a detection program 407b, a calculation program 407c, a determination program 407d, a clustering program 407e, and a transmission program 407f. The CPU 401 reads out the acquisition program 407a, the detection program 407b, the calculation program 407c, the determination program 407d, the clustering program 407e, and the transmission program 407f, and deploys these programs on the RAM 406.

The acquisition program 407a functions as an acquisition process 406a. The detection program 407b functions as a detection process 406b. The calculation program 407c functions as a calculation process 406c. The determination program 407d functions as a determination process 406d. The clustering program 407e functions as a clustering process 406e. The transmission program 407f functions as a transmission process 406f.

The processing of the acquisition process 406a corresponds to the processing of the acquisition units 110, 210, and 310. The processing of the detection process 406b corresponds to the processing of the detection units 120, 220, and 320. The processing of the calculation process 406c corresponds to the processing of the calculation units 130, 230, and 330. The processing of the determination process 406d corresponds to the processing of the determination units 140, 240, and 340. The processing of the clustering process 406e corresponds to the processing of the clustering units 150, 250, and 350. The processing of the transmission process 406f corresponds to the processing of the transmission units 160, 260, and 360.

It should be noted that the programs 407a to 407f are not necessarily stored in the hard disk device 407 from the beginning. For example, the programs may be stored in a "transportable physical medium" such as a flexible disk (FD), a CD-ROM, a DVD disk, a magneto-optical disk, an IC card or the like to be inserted into the computer 400. Then, the computer 400 may read out and execute each of the programs 407a to 407f.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to an illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable recording medium having stored therein a program that causes a computer to execute a procedure, the procedure comprising:

detecting a plurality of voice sections from an input sound that includes voices of a plurality of speakers;

calculating a plurality of feature amounts of each of the plurality of voice sections;

determining a plurality of emotions, corresponding to the plurality of voice sections respectively, of a speaker of the plurality of speakers;

classifying a plurality of first feature amounts of a first voice section determined as a first emotion of the plurality of emotions of the speaker and a plurality of second feature amounts of a second voice section determined as a second emotion of the plurality of emotions of the speaker into a plurality of first clusters and a plurality of second clusters, respectively;

generating a change vector coupled to one of the plurality of first clusters and one of the plurality of second clusters, based on a combination of each of the plurality of first clusters and each of the plurality of second clusters;

clustering the plurality of feature amounts for each speaker, based on the change vector; and outputting user voice information in which a voice of each of the plurality of voice sections is associated with a speaker based on a clustering result, wherein the clustering specifies a combination of each of the plurality of first clusters and each of the plurality of second clusters with a maximum similarity between directions of a plurality of change vectors, and wherein the calculating calculates the plurality of feature amounts, based on a neural network learned using learning data that associate the information of each of the plurality of voice sections with the speaker.

2. The non-transitory computer-readable recording medium according to claim 1, the procedure further comprising:

correcting the plurality of second feature amounts of the second voice section determined as the second emotion, based on the change vector, and wherein the procedure, in the clustering, clusters the plurality of first feature amounts of the first voice section determined as the first emotion and a plurality of corrected second feature amounts.

3. The non-transitory computer-readable recording medium according to claim 1, wherein the procedure, in the generating, generates the change vector coupled to one of the plurality of first clusters of the first voice section determined as a neutral emotion of the plurality of emotions and one of the plurality of second clusters of the second voice section determined as an emotion other than the neutral emotion.

4. The non-transitory computer-readable recording medium according to claim 1, wherein the procedure further comprises:

associating the voice section that corresponds to the plurality of feature amounts with the speaker, based on a result of the clustering the plurality of feature amounts.

5. The non-transitory computer-readable recording medium according to claim 1, wherein the procedure, in the clustering, evaluates the similarity, based on a cosine similarity or a Pearson correlation coefficient between a plurality of change vectors.

6. The non-transitory computer-readable recording medium according to claim 1, wherein the procedure, in the determining, determines the plurality of emotions of the speaker, based on the plurality of feature amounts of the voices included in each of the plurality of voice sections.

7. The non-transitory computer-readable recording medium according to claim 1, wherein the procedure, in the determining, determines the plurality of emotions of the speaker, based on a face image of the speaker.

8. The non-transitory computer-readable recording medium according to claim 1, wherein the procedure, in the determining, determines the plurality of emotions of the speaker, based on biological information of the speaker.

9. The non-transitory computer-readable recording medium according to claim 1, wherein the procedure, in the calculating, calculates the plurality of feature amounts related to a harmonicity, periodicity or signal strength as the plurality of feature amounts of each of the plurality of voice sections.

10. The non-transitory computer-readable recording medium according to claim 9, wherein the procedure, in the calculating, extracts one of a spectrum correlation of the input sound, a formant frequency, an autocorrelation coefficient of the input sound, a pitch frequency, power of the input sound, an SNR (Signal-Noise Ratio) and spectrum power, as the plurality of feature amounts of each of the plurality of voice sections.

11. A voice processing method comprising:

detecting a plurality of voice sections from an input sound that includes voices of a plurality of speakers;

calculating a plurality of feature amounts of each of the plurality of voice sections;

determining a plurality of emotions, corresponding to the plurality of voice sections respectively, of a speaker of the plurality of speakers;

classifying a plurality of first feature amounts of a first voice section determined as a first emotion of the plurality of emotions of the speaker and a plurality of second feature amounts of a second voice section determined as a second emotion of the plurality of emotions of the speaker into a plurality of first clusters and a plurality of second clusters, respectively;

generating a change vector coupled to one of the plurality of first clusters and one of the plurality of second clusters, based on a combination of each of the plurality of first clusters and each of the plurality of second clusters;

clustering the plurality of feature amounts for each speaker, based on the change vector; and outputting user voice information in which a voice of each of the plurality of voice sections is associated with a speaker based on a clustering result, by a processor, wherein the clustering specifies a combination of each of the plurality of first clusters and each of the plurality of second clusters with a maximum similarity between directions of a plurality of change vectors, and wherein the calculating calculates the plurality of feature amounts, based on a neural network learned using learning data that associate the information of each of the plurality of voice sections with the speaker.

12. A voice processing apparatus comprising:

a memory; and a processor coupled to the memory and the processor configured to:

detect a plurality of voice sections from an input sound that includes voices of a plurality of speakers;

calculate a plurality of feature amounts of each of the plurality of voice sections;

determine a plurality of emotions, corresponding to the plurality of voice sections respectively, of a speaker of the plurality of speakers;

classify a plurality of first feature amounts of a first voice section determined as a first emotion of the plurality of emotions of the speaker and a plurality of second feature amounts of a second voice section determined as a second emotion of the plurality of emotions of the speaker into a plurality of first clusters and a plurality of second clusters, respectively;

generate a change vector coupled to one of the plurality of first clusters and one of the plurality of second clusters, based on a combination of each of the plurality of first clusters and each of the plurality of second clusters;

cluster the plurality of feature amounts for each speaker, based on the change vector; and output user voice information in which a voice of each of the plurality of voice sections is associated with a speaker based on a clustering result, wherein, in the clustering of the plurality of feature amounts, the processor specifies a combination of each of the plurality of first clusters and each of the plurality of second clusters with a maximum similarity between directions of a plurality of change vectors, and wherein the calculating calculates the plurality of feature amounts, based on a neural network learned using learning data that associate the information of each of the plurality of voice sections with the speaker.

\* \* \* \* \*